United States Patent
Cheng et al.

(10) Patent No.: US 12,400,421 B2
(45) Date of Patent: Aug. 26, 2025

(54) SIMULTANEOUS ORIENTATION AND SCALE ESTIMATOR (SOSE)

(71) Applicant: California Institute of Technology, Pasadena, CA (US)

(72) Inventors: Yang Cheng, Arcadia, CA (US); Adnan I. Ansar, Granada Hills, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 321 days.

(21) Appl. No.: 17/818,634

(22) Filed: Aug. 9, 2022

(65) Prior Publication Data

US 2023/0046609 A1 Feb. 16, 2023

Related U.S. Application Data

(60) Provisional application No. 63/230,940, filed on Aug. 9, 2021.

(51) Int. Cl.
 *G06V 10/24* (2022.01)
 *G06V 10/44* (2022.01)
 (Continued)

(52) U.S. Cl.
 CPC ............ *G06V 10/507* (2022.01); *G06V 10/24* (2022.01); *G06V 10/44* (2022.01); *G06V 10/771* (2022.01);
 (Continued)

(58) Field of Classification Search
 None
 See application file for complete search history.

(56) References Cited

U.S. PATENT DOCUMENTS 4,179,693 A * 12/1979 Evans ........................ G01S 7/04
342/64
10,796,196 B2 * 10/2020 Song .................... G06V 10/464
(Continued)

FOREIGN PATENT DOCUMENTS

CN 110738696 A * 1/2020 ............... B60R 1/00

OTHER PUBLICATIONS

Yu M, Zhang D, Lee D-J, Desai A. SR-SYBA: A Scale and Rotation Invariant Synthetic Basis Feature Descriptor with Low Memory Usage. Electronics. 2020; 9(5):810. https://doi.org/10.3390/electronics9050810 (Year: 2020) (Year: 2020).*

(Continued)

*Primary Examiner* — Bernard Krasnic
(74) *Attorney, Agent, or Firm* — Gates & Cooper LLP

(57) ABSTRACT

A method and hardware based system provide for descriptor-based feature mapping during terrain relative navigation (TRN). A first reference image/premade terrain map and a second image are acquired. Features in the first reference image and the second image are detected. A scale and an orientation of the one or more detected features are estimated based on an intensity centroid (IC), moments of the detected features, an orientation which is in turn based on an angle between a center of each of the detected features and the IC, and an orientation stability measure which is in turn based on a radius. Signatures are computed for each of the detected features using the estimated scale and orientation and then converted into feature descriptors. The descriptors are used to match features from the two images which are then used to perform TRN.

18 Claims, 12 Drawing Sheets

(51) Int. Cl.
  *G06V 10/50* (2022.01)
  *G06V 10/77* (2022.01)
  *G06V 10/771* (2022.01)
  *G06V 10/772* (2022.01)
  *G06V 10/98* (2022.01)

(52) U.S. Cl.
  CPC ........ *G06V 10/7715* (2022.01); *G06V 10/772* (2022.01); *G06V 10/98* (2022.01)

(56) References Cited

U.S. PATENT DOCUMENTS

| | | | | |
|---|---|---|---|---|
| 2015/0341647 | A1* | 11/2015 | Yun | H04N 19/176 |
| | | | | 382/232 |
| 2016/0125267 | A1* | 5/2016 | Goldman | G06V 10/757 |
| | | | | 348/47 |
| 2016/0275683 | A1* | 9/2016 | Sakano | H04N 7/181 |
| 2019/0146500 | A1* | 5/2019 | Yalla | G01C 21/3407 |
| | | | | 701/25 |

OTHER PUBLICATIONS

Lowe, D.G., "Distinctive Image Features from Scale-Invariant Keypoints", International Journal of Computer Vision, 2004, pp. 91-110, vol. 60, No. 2.

Rosin, P.L., "Measuring Corner Properties", Computer Vision and Image Understanding, 1999, pp. 291-307, vol. 73, No. 2.

Bay, H., et al., "SURF: Speeded Up Robust Features", Computer Vision—ECCV 2006, Part I, LNCS 3951, pp. 404-417.

Koenderink, J.J., "The Structure of Images", Biological Cybernetics, 1984, pp. 363-396, vol. 50.

Lindeberg, T., "Scale-space theory: A basic tool for analysing structures at different scales", Journal of Applied Statistics, 1994, pp. 224-270, vol. 21, No. 2.

Mikolajcyk, K., et al., "An affine invariant interest point detector", 7th European Conference on Computer Vision (ECCV '02), May 2002, Copenhagen, Denmark. pp. 128-142.

Rublee, E., et al., "ORB: an efficient alternative to SIFT or SURF", ICCV 2011, pp. 2564-2571.

Alcantrilla, P.F., et al., "KAZE Features", ECCV 2012, Part VI, LNCS 7577, pp. 214-227.

Brown, M., et al., "Multi-Image Matching using Multi-Scale Oriented Patches", 2005 IEEE Computer Society Conference on Computer Vision and Pattern Recognition, 2005, pp. 1-8, vol. 1.

Mikolajcyk, K., et al., "Scale & Affine Invariant Interest Point Detectors", International Journal of Computer Vision, 2004, pp. 63-86, vol. 60, No. 1.

Johnson, A.E., et al., "Mar. 2020 Lander Vision System Flight Performance", AIAA SciTech Forum, Jan. 3-7, 2022, pp. 1-20.

Owens, C., et al., "Development of a Signature-based Terrain Relative Navigation System for Precision Landing", AIAA SciTech Forum, Jan. 2021, pp. 1-20.

Ansar, A., et al., "Linear Pose Estimation from Points or Lines", IEEE Transactions on Pattern Analysis and Machine Intelligence, May 2003, pp. 578-589, vol. 25, Issue 5.

Torr, P.H.S., et al., "The Development and Comparison of Robust Methods for Estimating the Fundamental Matrix", International Journal of Computer Vision, 1997, pp. 271-300, vol. 24, No. 3.

"Manual of Photogrammetry", ASPRS, 5th Ed., 2004. pp. 280, 498.

Fischler, M.A., et al., "Random Sample Consensus: A Paradigm for Model Fitting with Applications to Image Analysis and Automated Cartograph", Communications of the ACM, Jun. 1981, pp. 381-395, vol. 24, No. 6.

Agrawal, M., et al., "CenSurE: Center Surround Extremas for Realtime Feature Detection and Matching", Lecture Notes in Computer Science, 2008, pp. 102-115, vol. 5305.

* cited by examiner

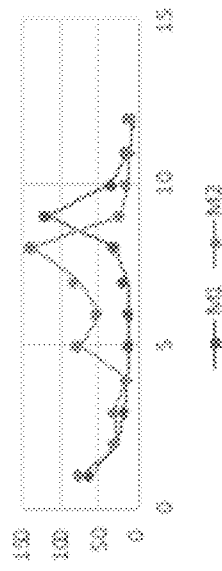
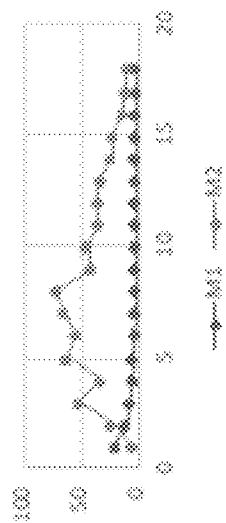
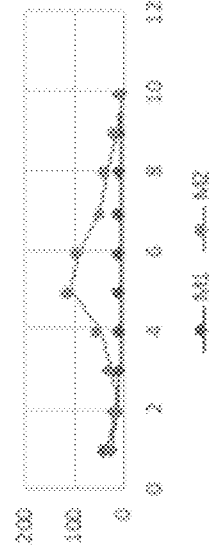
FIG. 3
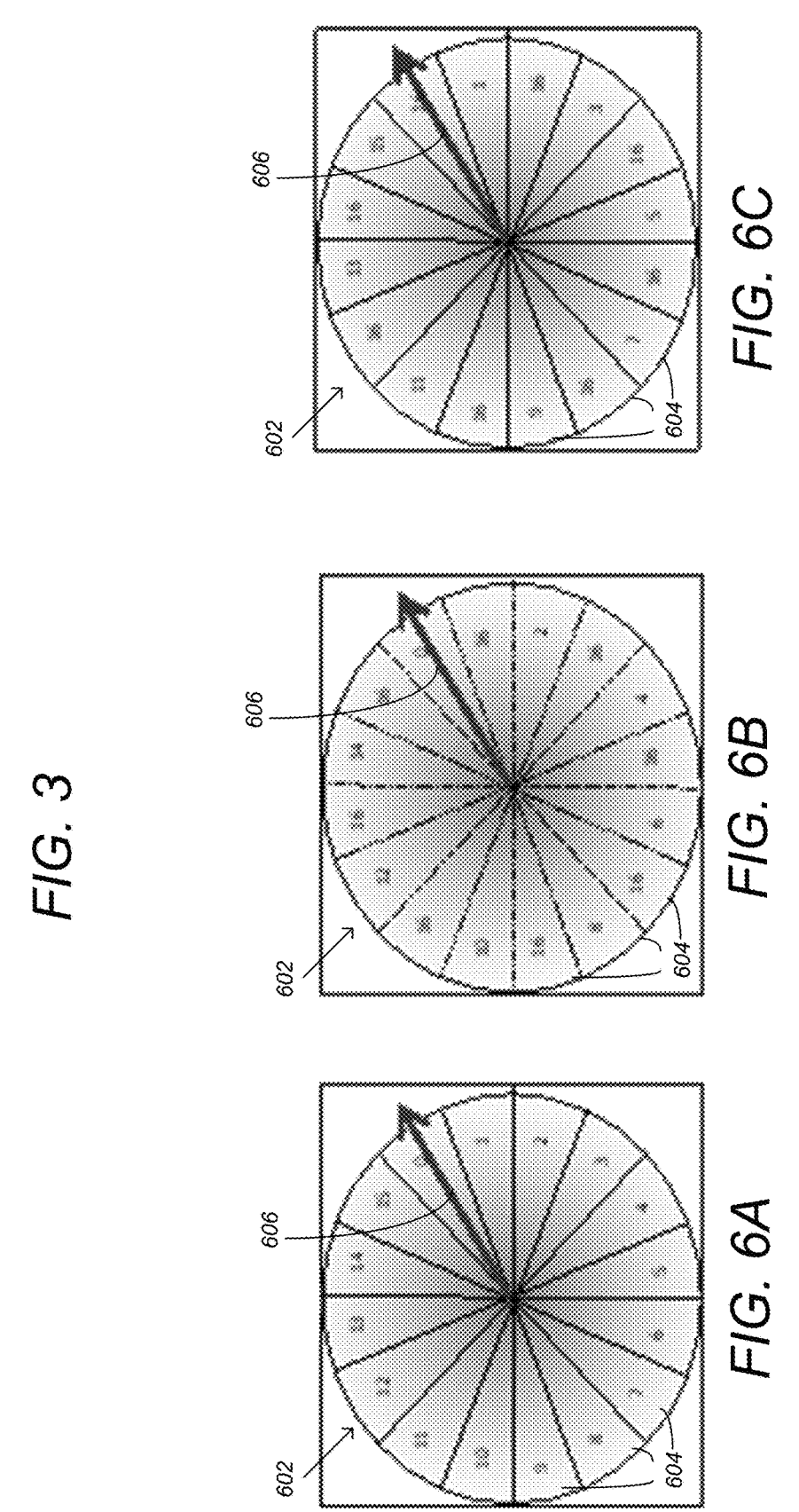
FIG. 6A
FIG. 6B
FIG. 6C

SIMULTANEOUS ORIENTATION AND SCALE ESTIMATOR (SOSE)

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 63/230,940, filed on Aug. 9, 2021, with inventor(s) Adnan I Anar and Yang Cheng, entitled "Blockwise Outlier Rejection Scheme for Efficient Image to Map Matching."

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present invention relates generally to vision-based perception for any robotic system, focusing on but not limited to spacecraft landing and navigation, and in particular, to a method, apparatus, system, and article of manufacture for estimating feature scale and orientation for terrain mapping for spacecraft navigation and landing.

2. Description of the Related Art (Note: This application references a number of different publications as indicated throughout the specification by reference names enclosed in brackets, e.g., [Smith]. A list of these different publications ordered according to these reference names can be found below in the section entitled "References." Each of these publications is incorporated by reference herein.)

Terrain relative navigation (TRN) has become an important capability for spacecraft to land precisely on another planetary body. An onboard TRN system carries a premade terrain map of a landing site (referred to as a reference map) and then a descent image (e.g., captured via an onboard camera) is matched to the reference map to estimate the spacecraft pose (both attitude and position). Such a matching is often based on matching features from both images (referred to as feature matching).

Under normal conditions, the spacecraft attitude and altitude are known due to on-board instruments such as the IMU (inertial measurement unit), star tracker and altimeter. When a partial spacecraft pose is known, the TRN algorithms can be greatly simplified. For example, if the attitude and altitude are known, a feature's scale and orientation may be easily determined, thereby dramatically reducing the search scope during feature matching. Furthermore, if the attitude is known, outlier rejection may be computed by a simple triangulation approach where only two features are needed for a position estimation. However, when such information is absent, the problem becomes more complicated. To better understand such problems, an explanation of prior art feature matching may be useful.

Since David Lowe published his paper on the Scale-Invariant Feature Transform (SIFT) [Lowe], descriptor-based feature matching has become a standard in computer vision and beyond. SIFT leverages earlier work in scale-space theory [Koenderink][Lindeberg] to define scale-stable key-points in an image as extrema in a representation of the image formed by convolution with a bank of difference of Gaussian kernels separated by a fixed scale factor. Extrema in this Difference of Gaussian (DoG) space approximate extrema of the scale-normalized Laplacian of Gaussian, which was previously shown [Lindeberg][Mikolajcyk] to produce scale-invariant key-points. Since Lowe's work, many descriptor-based feature recognition algorithms have been produced. These include computational simplifications to SIFT, such as SURF [Bay], novel types of descriptors (ORB [Rublee]) and modifications to the scale-space formalism (KAZE [Alcantarilla]), as well as many others.

A common drawback of descriptor-based approaches for efficient hardware implementation is that they use image pyramids or banks of image convolutions to model a scale-space representation. Random data access in the process of exhaustive search in scale-space is not amenable to parallelization or FPGA (field programmable gate array) implementation. However, if the scale-space representation scheme is simplified, these approaches typically suffer from poorer performance in scale-invariance.

In view of the above, what is needed is a descriptor based feature matching approach that can be implemented in FPGA or other parallelizable hardware.

SUMMARY OF THE INVENTION

Embodiments of the invention present a novel, fast and robust descriptor-based feature matching algorithm called Simultaneous Orientation and Scale Estimator (SOSE). One innovation in this novel approach is in efficiency of scale and orientation estimation. Unlike the other descriptor approaches, which rely on image pyramids or convolutions with banks of scale-dependent kernels to estimate a feature scale, SOSE estimates feature scale and orientation simultaneously from the image at its native scale. This novel approach has significant benefits for hardware implementation both because of low computational cost and a dramatic reduction in random data access introduced by the pyramid scheme.

Embodiments of the invention also present a novel approach for feature scale and orientation estimation. Studies show it is a highly effective approach for feature selection. Although its performance may be slightly worse than classic algorithms such as SIFT, such inferior performance is mainly due to the gridded feature selection rather than SOSE itself. Embodiments of the invention do not need a pyramid scheme for scale estimation. As embodiments may provide a single layer approach, the computations for pyramid construction and scale search are no longer needed. Thus, embodiments of the invention provide an easier implementation and faster approach compared to that of the prior art. In addition, embodiments of the invention may be parallelized on FPGA or other embedded systems. The use of a single layer feature scale estimator may also eliminate many computations for pyramid and scale (thus improving speed by a factor of nine (9) compared to SIFT).

Embodiments of the invention are also faster and more feasible for firmware implementation than SOA signature-based feature matching algorithms.

BRIEF DESCRIPTION OF THE DRAWINGS

Referring now to the drawings in which like reference numbers represent corresponding parts throughout:

FIG. 3 shows curves of partial derivatives over r in accordance with one or more embodiments of the invention;

FIGS. 6A-6C illustrate descriptor extraction in accordance with one or more embodiments of the invention;

DETAILED DESCRIPTION OF THE INVENTION

Figure 1:
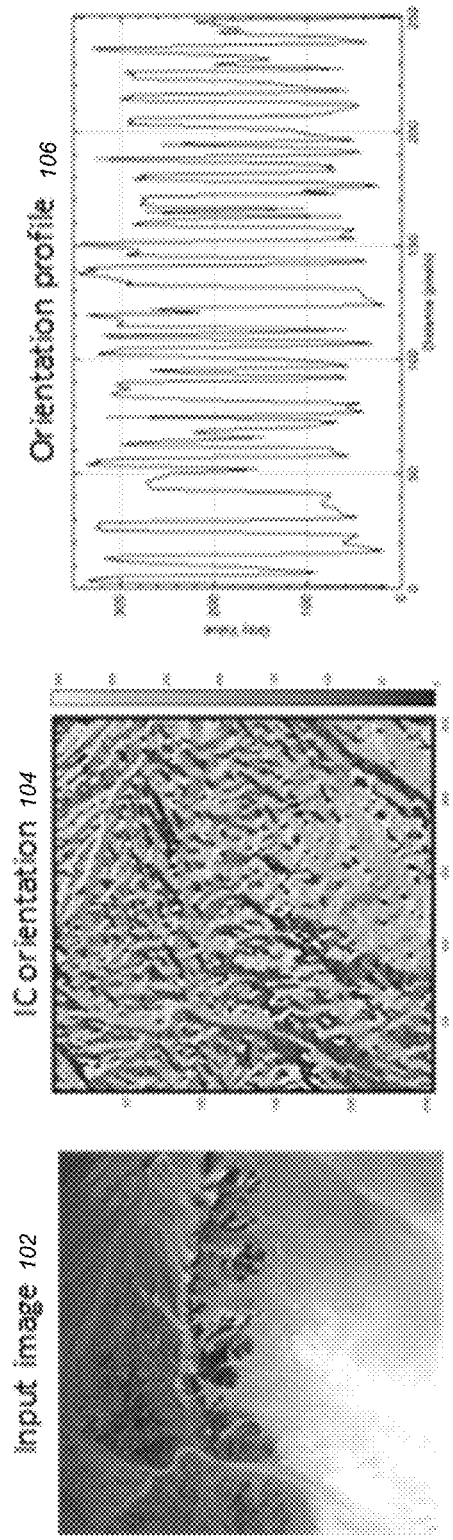
FIG. 1 shows an input image and its Intensity Centroid (IC) orientation map of a fixed window size in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Simultaneous Orientation and Scale Estimator (SOSE)

Embodiments of the invention provide a novel approach that can estimate feature scale and orientation in a single image layer, which means the detailed scale representation, which may be essential for good performance of most other algorithms, becomes unnecessary.

Ongoing missions and projects such as the Mars Sample Return (MSR) mission, the lunar lander or human missions rely on terrain relative navigation (TRN) to land precisely at a targeted area. SOSE provides a critical capability of TRN. Current TRN algorithms rely on altimeter readings such as TDS (terminal descent sensor) to provide scale information for feature matching. SOSE estimates the scale quickly and reliably, and as a result, SOSE can replace the TDS, which is a heavy and power hungry instrument. To save or reduce the spacecraft mass is critically important for MSR missions.

Single Level Orientation and Scale Estimation

Descriptor based feature matching can be divided into three steps: (1) feature detection; (2) descriptor construction; and (3) descriptor matching.

A feature detected by feature detection is a small image patch, such as such as a corner, extrema (peak or minima), or a small topographic feature, such as crater, boulder, etc., which contains a unique signature that differs from other image patches in the same or different scale. The scale and orientation of detected features are then determined. Finally, certain signatures are taken from a region centered on a local feature using the estimated scale and orientation, and converted into descriptors. The image signatures commonly considered are intensity, color, texture and gradience, etc. A feature descriptor's performance under any possible variations (scale, orientation, perspective distortion, lighting, etc.) is dependent on the following properties: (a) repeatability; (b) accuracy and locality; (c) invariance and its sensitivity; and (d) efficiency. Details for each of these properties follow.

Repeatability: Given two images of the same object or scene, taken under different viewing conditions, a high percentage of the features (from the scene) should be found in both images. Under a particular definition of feature type, the number of features in an image could be from a limited number to an infinite number. For example, the number of visible topographic feature such as craters, or boulders in a piece of Mars or the Moon terrain is limited. In this case, the repeatability is defined as how well an algorithm can detect these topographic features. On the other hand, some features may be loosely defined as some type/kind of a corner such as a Harris corner. In this regard, the number of features could vary greatly depending on the threshold used to define the features. In one or more embodiments, only the top N "best" features are selected. However, the feature "goodness", which is typically a measure intrinsically tied to the feature detection method, is not always viewing and scale invariant, and therefore the features' "goodness" could vary from image to image and the repeatability of the features may suffer. Accordingly, one or more embodiments of the inventions detect a sufficiently large number of features, so that a reasonable number of features are detected in both images such that a sufficient number of matched features can be determined in the subsequent steps. However, too many features could slow down the process. Ideally, the number of detected features may be adaptable over a large range by a simple and intuitive threshold. The density of features should reflect the information content of the image to provide a compact image representation. The optimal feature density depends on mission requirements, on board compute resources, scene content, etc. This number is usually derived using a combination of simulations and formal data analysis.

Accuracy and locality: The detected features should be accurately localized in both images with respect to scale, and possibly viewing angle as well as translation. An extensive study about various feature detection accuracies under different variations shows most of the algorithms have about 1~3 pixels error. Some of the attempts to improve the feature location by subpixel interpolation or affine approximation only resulted in a very limited improvement. A 1 to 3 pixel position error could potentially alter the image patch properties such as the orientation as well as the signature, thereby ultimately causing a feature matching failure. Because improving the feature selection accuracy is very difficult, mitigating or reducing the impact of the inaccurate features may be desirable.

Invariance and its sensitivity: One potentially critical computation for a descriptor feature is to determine the feature's invariance properties such as the scale and orientation under different scale and viewing angles. SIFT uses image pyramids or convolutions with banks of scale-dependent kernels to estimate a feature scale. Another prior art algorithm uses Harris/Hessian corners with different Laplace kernels to estimate the feature scale. Most of the prior art algorithms involve multi-level data layers and three dimensional (3D) searching (two spatial dimensions and one scale dimension). As a result, such prior art schemes require a large volume of memory space to store the data layers. Further, 3D searching may involve significant random memory access which is prohibitively expensive—particularly for FPGA hardware implementations. Other algorithms such as STAR, a computationally efficient variant of the Center Surround Extremas (CenSurE) algorithm [Agrawal], directly use the homogeneous regions (blocks) as scale measurements. However, such algorithms work only in the scene where sufficient homogeneous blocks exist and which unfortunately is not always the case.

Efficiency: In one or more embodiments, the detection of features in a new image allows for time-critical applications. An algorithm that uses smaller memory space and has less random memory access will be beneficial for improving the execution speed.

Embodiments of the invention may focus on the efficiency improvement by eliminating multi-level data layers and most random memory access operations in the key point scale and orientation estimation.

[Rosin] proposed the notion of orientation for an image patch in terms of its first order moments. [Rosin] defines the moments of a patch $m_{pq}$ as:

$$m_{pq} = \sum_{x,y} x^p y^q I(x, y) \qquad \text{Eq. (1)}$$

where x is column distance to the patch center, y is row distance to the patch center and I(x,y) is image intensity.

The Intensity Centroid (IC), analogous to an intensity-derived center of mass, of the patch is given by $$IC=(m_{01}/m_{01}, m_{10}/m_{00})$$

where $m_{mn}$ is defined by Eq. 1.

It follows that a natural orientation for the patch is then given by the angle between the patch center and the IC $$\theta = a\tan 2(m_{01}, m_{10}) \qquad \text{Eq. (2)}$$

Assuming an image patch is rotated by an angle α, a pixel (x, y) in the rotated patch will be $$x' = x\cos(\alpha) - y\sin(\alpha)$$

$$y' = x\sin(\alpha) + y\cos(\alpha) \qquad \text{Eq. (3)}$$

Substitute Eq. (3) into Eq. (2), we find after simplification that the newly estimated orientation of the rotated patch is $$\theta' = a\tan 2(m'_{01}, m'_{10}) = \theta + \alpha \qquad \text{Eq.(4)}$$

In addition, the IC is scale invariant because if the image is scaled by a factor s as x'=sx and y'=sy, the θ remains constant.

The rotation and scale invariance property of IC make the IC the most reliable image orientation estimator. For example, [Rublee] stated that the IC performs better in recovering patch orientation than either a histogram binning, such as SIFT employs, or selection of the maximum gradient value in the patch. IC-based orientation is an essential part of the well-known ORB (Orientated FAST and Rotated BRIEF) descriptor, which is rotation invariant and resistant to noise.

Although, the IC gives the most accurate orientation estimate, it is not always stable spatially. For example, FIG. 1 shows an input image 102 and its IC orientation map of a fixed window size 104. One may find that the orientation changes quite rapidly spatially. Even a few pixels of spatial shift can result in wide variation that changes rapidly in the computed orientation. This variation in computed orientation can be clearly seen in the orientation profile 106 for a single line of the image. Descriptor matching typically relies on a good estimate of orientation and the prior art feature detection algorithms could have 1 to 3 pixel location errors. Thus, a spatially unstable orientation estimate could have a negative impact to feature matching.

Figure 2:
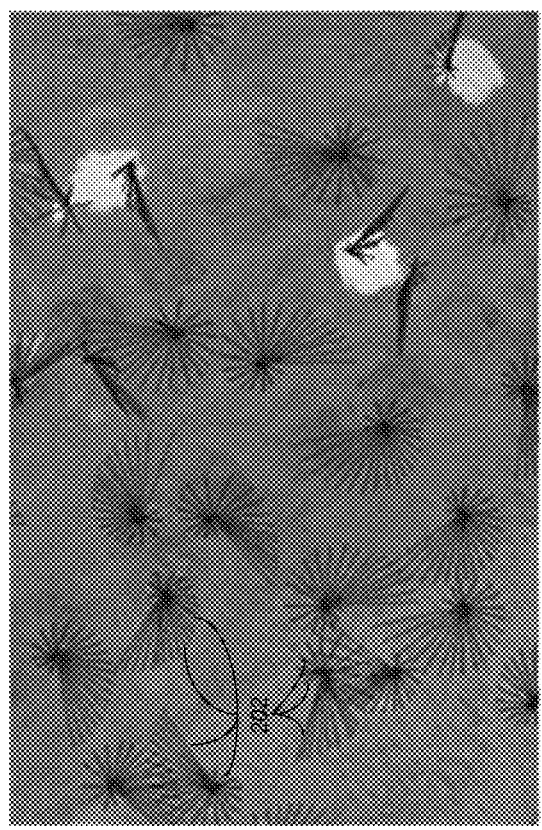
FIG. 2 illustrates an IC orientation as a function of image patch radius in accordance with one or more embodiments of the invention.

In addition, the IC orientation 104 varies with image patch size. FIG. 2 illustrates the IC orientation as a function of the image patch radius (i.e., the IC orientation direction is illustrated at different radii where the line segment provides the radius and direction). More specifically, the direction of line segments 202 provide the IC orientation and the length of line segments 202 defines the radii. Some features have relatively small variations in their orientation compared to others. The orientation change rate for a single feature is not always the same, and at certain radii, the orientation may be relatively stable.

In view of the above, an identification of a moment when the orientation is relative stable spatially and radially will lead to a stable and accurate orientation estimation.

The partial derivative over x, y of Eq. (2) is:

$$\frac{\partial \theta}{\partial x} = \frac{1}{1+\tan^2\theta}\left(\frac{\sum(I+xI_x)\sum yI - \sum yI_x \sum xI}{(\sum yI)^2}\right) \qquad \text{Eq. (5)}$$

$$\frac{\partial \theta}{\partial y} = \frac{1}{1+\tan^2\theta}\left(\frac{\sum I_y \sum yI - \sum xI \sum(I - yI_y)}{(\sum yI)^2}\right)$$

The orientation stability measure ($M_1$) may be defined at P(x, y) as $$M_1(r) = \left[\left(\frac{\partial \theta}{\partial x}\right)^2 + \left(\frac{\partial \theta}{\delta y}\right)^2\right](x^2+y^2) < r^2 \qquad \text{Eq. (5)}$$

For any given point, one would like to find r so that $M_1(r)$ is close to zero, $$M_1(r) < t \qquad \text{Eq. (6)}$$

where t is a threshold Since $M_1(r)$ is close to zero, the orientation is locally approximated by a constant, hence the orientation of a patch is stable spatially within a radius r of the patch center. For example, if P is moved slightly, dP(dx, dy), the new orientation is then $$\theta' = \theta + \frac{\partial \theta}{\partial x}dx + \frac{\partial \theta}{\partial y}dy \approx \theta \quad \text{Eq. (7)}$$

On the other hand, one may also define another matrix, so the IC will be stable radially as:

$$M_2(r) =$$

$$\tan(\theta(r) - \theta(r+dr)) = \tan\left(\arctan\left(\frac{\sum_r xI}{\sum_r yI}\right) - \arctan\left(\frac{\sum_{r+dr} xI}{\sum_{r+dr} yI}\right)\right) =$$

$$\frac{\sum_r xI \sum_{r+dr} xI - \sum_r yI \sum_{r+dr} xI}{\sum_r xI \sum_{r+dr} xI + \sum_r yI \sum_{r+dr} yI} < d\Theta \quad \text{Eq. (8)}$$

Then one defines the scale S at point P as the radius r when $M_1$ and $M_2$ are smaller than their thresholds.

To find the scale r, one can start with a small radius (e.g., 7) and then increases the radius until $M_1$ and $M_2$ (Eq. (6)) stabilizes. This provides both the scale of the point and a stable orientation from the IC computed over a radius r. FIG. 3 shows curves of $M_1$ and $M_2$ as a function of r. When $M_1$ and $M_2$ move close to zero, the IC orientation is stable spatially and radially, and the radius of this moment is then used as the scale of this feature. As illustrated, the scale converges at different speeds dependent on the local texture properties. In high texture areas, it converges faster than at low texture areas. Such behavior is very similar to other scale estimators.

Computationally, the process described is very simple and does not involve any image pyramids or scale-dependent banks of convolutional kernels. Further, it is very easy to implement in a parallel fashion, which may be critical for hardware implementation. The above-identified approach is referred to as Simultaneous Orientation and Scale Estimator (SOSE). It may be noted that because the scale and orientation are determined at the moment when they are stable spatially and radially, SOSE will improve and mitigate the problems caused by feature localization error and the sensitivity of invariancy.

Note that intrinsically, the core of SOSE may neither be a feature detector nor a feature descriptor algorithm. Instead, SOSE provides efficient scale and orientation estimates to any detector with repeatability over scale, rotation and other relevant image transformations. Embodiments of the invention may also use Harris corner detection as the feature selection algorithm and a descriptor similar to SURF described below.

SOSE Scale and Orientation Estimation Validation

Figure 4:
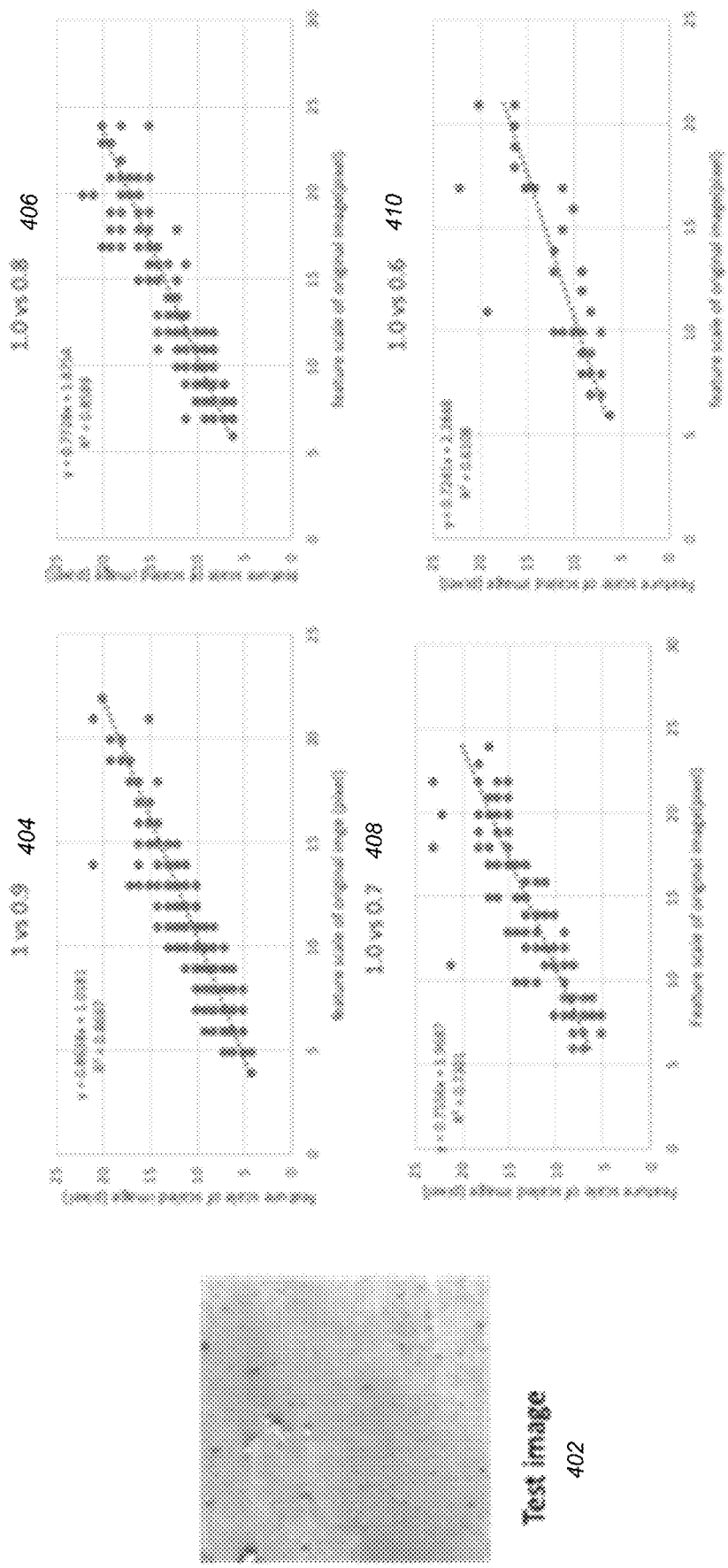
FIG. 4 shows the linear regression analysis of estimated feature scale between the original test image and scaled down images in accordance with one or more embodiments of the invention.

In order to test the effectiveness of SOSE, a test image (1024 by 1024 pixels) was scaled down at 0.9, 0.8, 0.7, 0.6. The SOSE estimator was then run between the original image and the scaled down image. FIG. 4 shows the linear regression analysis of feature scale between the original test image 402 and scaled down images (i.e., a SOSE scale estimation evaluation that works when the scale is greater than or equal to 0.6). The slopes of the regressions for scale=0.9 (404), 0.8 (406), 0.7 (408), and 0.6 (410) are 0.863 (in 404), 0.772 (in 406), 0.75 (in 408) and 0.724 (in 410).

The coefficients of determination ($R^2$) are 0.8697 (for 404), 0.8589 (406), 0.7320 (408) and 0.6108 (41) respectively. In each image 404-410, the horizontal axis provides the feature scale for the original image (in pixels) and the vertical axis provides the feature scale of the scaled image (in pixels). However, in one or more embodiments, SOSE stops working effectively when the scale is less than 0.6, likely due to insufficient support for the orientation estimate in the down-sampled image 402. In general, SOSE is sufficient to cover the scale range for many real-world applications. In extreme cases, a simplified pyramid scheme may be employed to extend the scale invariance beyond 0.6.

Figure 5:
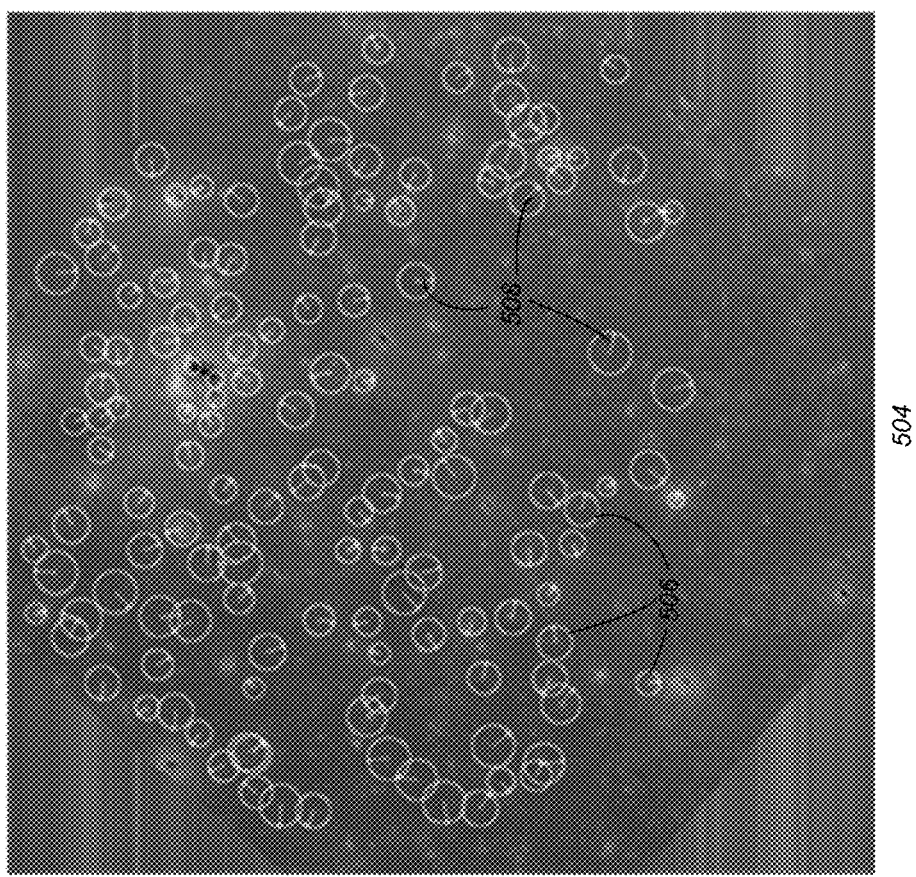
FIG. 5 shows the feature scales and orientations between a test image and a version of the same image rotated by 45 degrees in accordance with one or more embodiments of the invention.
Figure 5:
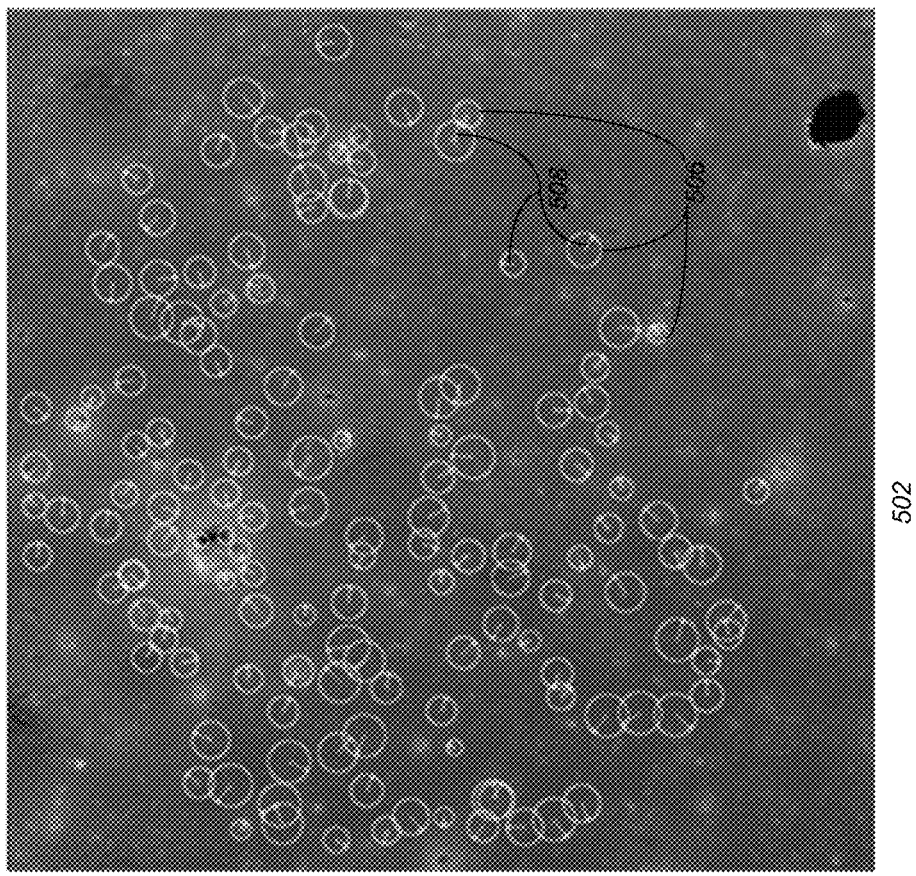

FIG. 5 shows the feature scales and orientations between a test image 502 and a version of the same image rotated by 45 degrees 504. The sizes of circles 506 reflect the feature scale and the arrows 508 inside each circle 506 reflect/represent the orientation. SOSE clearly performed well in scale and orientation estimation. In this regard, the orientation (arrows 508) and scale (circles 506) are independently estimated from the original test 502 image and its rotated image 504.

Descriptor Extraction

For the descriptor, embodiments of the invention may use an approach similar to SURF [Bay]. FIGS. 6A-6C illustrate descriptor extraction in accordance with one or more embodiments of the invention. The circular regions 602 are centered at a feature and each region 602 is divided into 16 wedges 604. Four quantities are extracted from each wedge 604. More specifically, for each wedge 604, four quantities (Σdx Σdy Σ|dx|Σ|dy|) are extracted. Unlike traditional SURF, which uses a 4 by 4 block, embodiments of the invention split the local area into 16 wedges 604 centered at the feature location where the circle radius is the scale r estimated from the last section. The wedge order is clockwise started at the feature orientation 606. The wedge angle for 16 wedges 604 is 22.5 degree. However, embodiments of the invention may increase this angle to 30 degrees to introduce a 3.75 degree overlap between adjacent wedges 604 in order to mitigate the effect of discretization. In view of the above, FIG. 6A illustrates 16 evenly divided wedges. Because the angle of each wedge was increased from 22.5 degrees to 30 degrees, masks were used for odd and even wedges. FIG. 6B illustrates even wedges, and FIG. 6C illustrates odd wedges).

This arrangement has a few advantages. First, it relaxes the precision requirement for orientation and scale. For example, the orientation can be precalculated as a discrete look up table which will avoid more expensive arctan operations. Second, it avoids any image transform, since the image rotation can be done by wedge index shifting.

$$dX = dx \cos(\theta_f) + dy \sin(\theta_f) \quad \text{Eq. (9)}$$

$$dY = -dx \sin(\theta_f) + dy \cos(\theta_f)$$

Where θf is the wedge azimuth angle and their cosine and sine values can be calculated and stored in a look up table. Because there are 16 wedges 604 and each wedge 604 has 16 quantities, the total descriptor has 64 entries.

The matching algorithm is a simple Euclidean distance with a threshold. If the maximum rotation change is known, the orientation can be used to filter out those features with large orientation differences.

Performance Evaluation

Figure 7B:
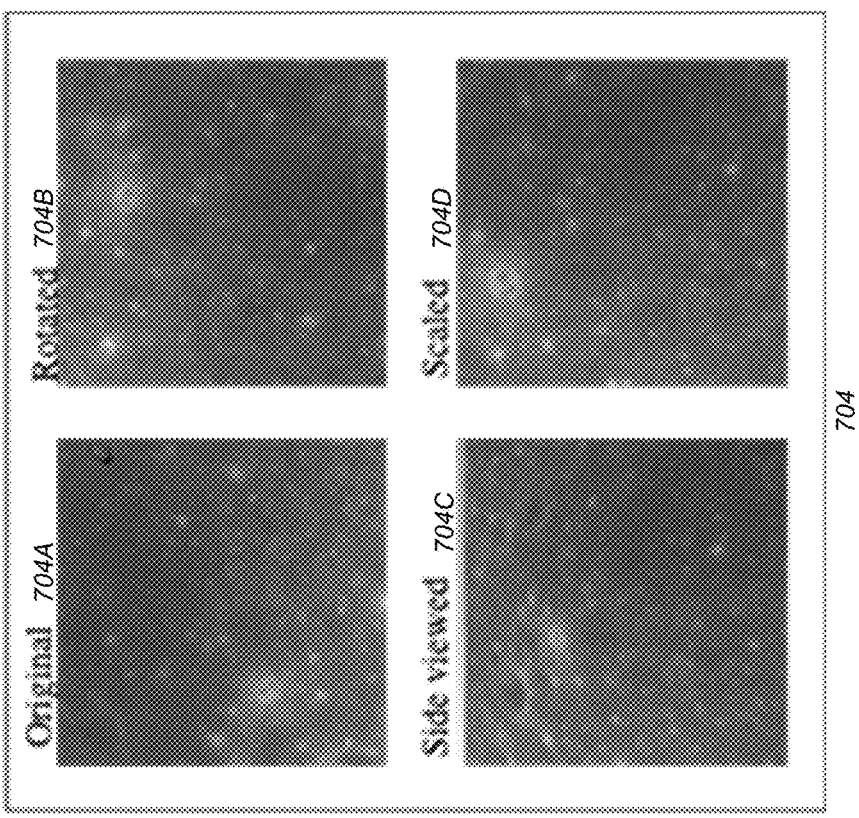
FIGS. 7A and 7B illustrate the two data sets used to evaluate SOSE in accordance with one or more embodiments of the invention.
Figure 7A:
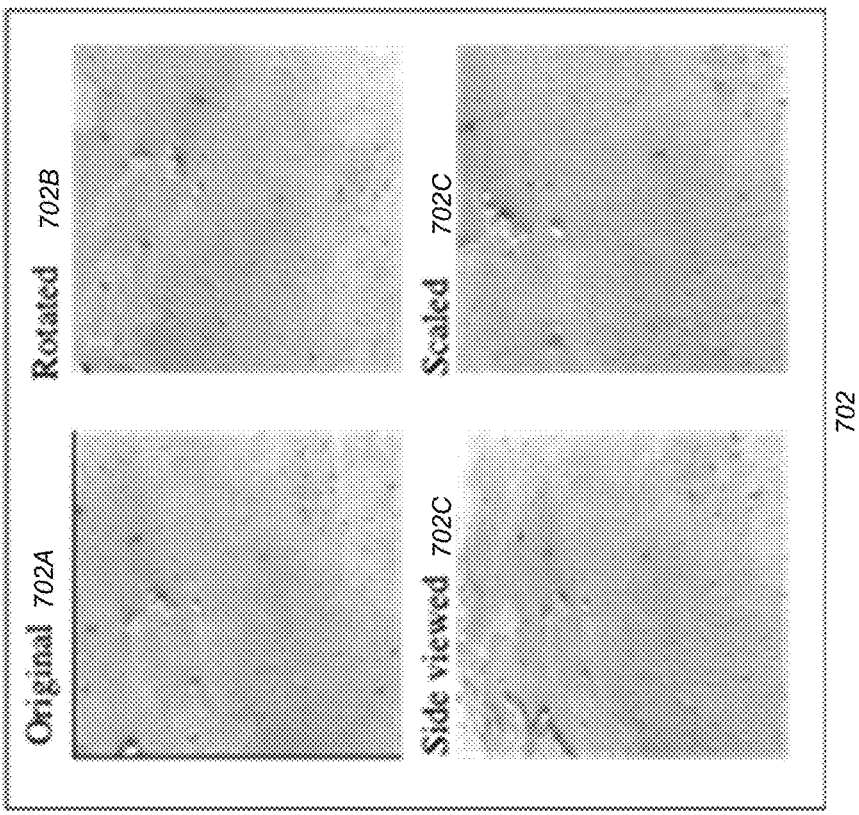

A performance evaluation of SOSE has been performed using two data sets with four scenarios: (1) images with synthetic in-plane rotation between 0 to 360 degrees; (2) synthetic image scales from 100 to 50% with 10% interval;

(3) off-nadir rotation from 0 to 45 degrees; and (4) images with different illumination conditions. FIGS. 7A and 7B illustrate the two data sets used to evaluate SOSE in accordance with one or more embodiments of the invention. The two data sets are the Jezero Crater (the Mars 2020 landing site) (FIG. 7A) and the Tranquilitatis of the Moon where a vertical pit was found (FIG. 7B). As indicated, each data set 702 and 704 contains an original image 702A/704A, a rotated image 702B/704B, a side viewed image 702C/704C, and a scaled image 702D/704D.

Figure 8A:
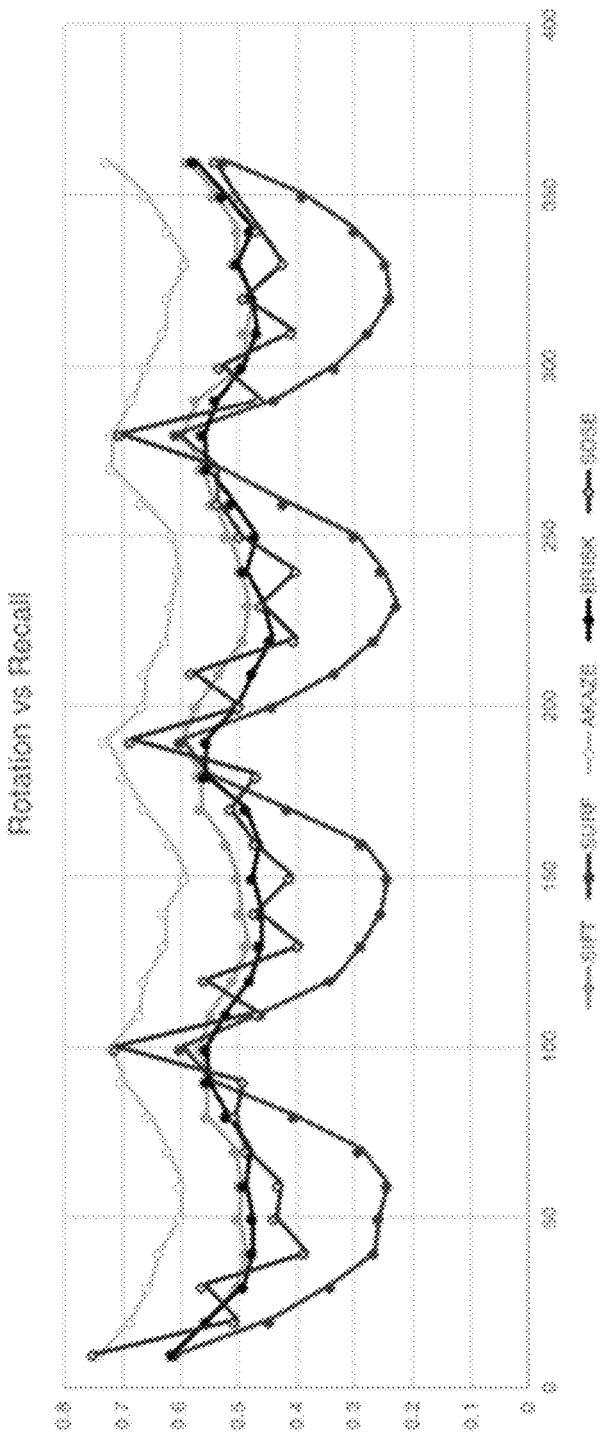
FIGS. 8A-8B illustrate plots comparing the testing for different algorithms in accordance with one or more embodiments of the invention.
Figure 8B:
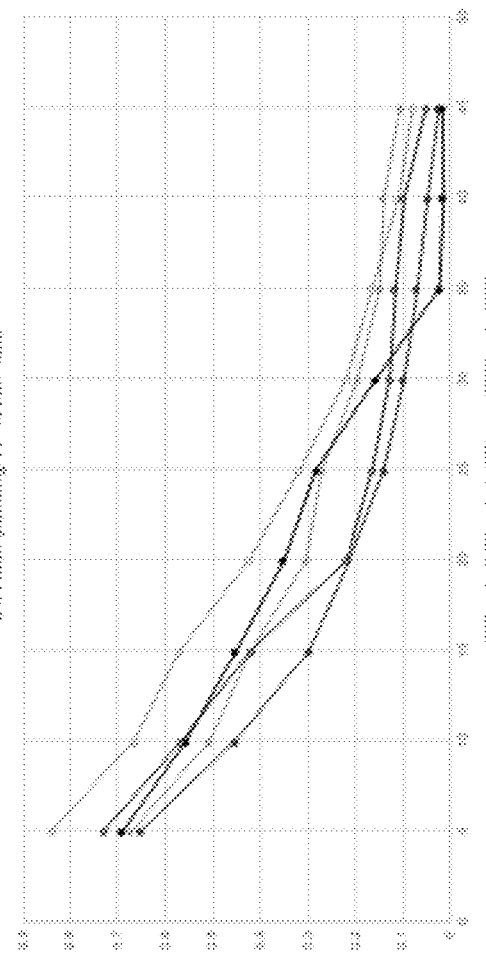

For testing, the SIFT, AKAZE, SURF, and Brisk algorithms were also executed on the data sets. FIGS. 8A-8B illustrate plots comparing the testing for the different algorithms. To make an apple-to-apple comparison, the number of features for each matcher were limited to 500 and the top 500 with the highest feature responses were selected. Testing indicated that AKAZE had the best performance while SOSE swings up and down around the curves of SIFT and BRISK. The potential cause of the performance problems may be the quantization error. In particular, the 360 degree is divided into 16 sectors and the wedge angle of each sector is 22.15 degree. Any orientation will be rounded for each sector and the maximum roundoff error is about 11.075 degree. More specifically, FIG. 8A illustrates a plot of rotation vs. recall for the different algorithms and FIG. 8B illustrates a plot of off Nadir pointing vs. the recall rate for the different algorithms. From these plots, it can be seen that when the round off error (vertical axis) is small, SOSE outperforms SIFT, and when the round off error is large, SOSE is slightly worse than SIFT.

Figure 9:
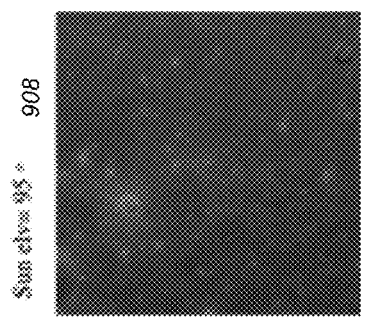
FIG. 9 illustrates test images with different sun elevations between 5 to 90 degrees with 5 degree intervals in accordance with one or more embodiments of the invention.
Figure 9:
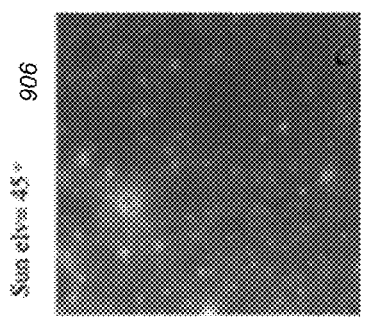
Figure 9:
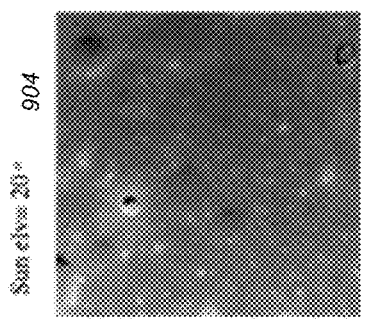
Figure 9:
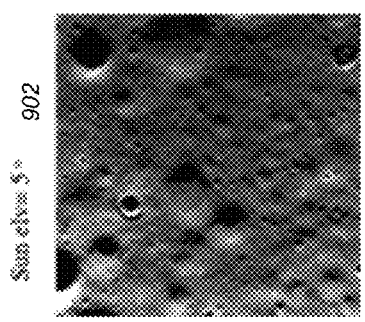

Testing may also co-marry the performance under different lighting conditions. FIG. 9 illustrates the test images with different sun elevations between 5 to 90 degrees with 5 degree intervals. In other words, in testing, synthetic images were rendered with sun angles between 5 to 90 degrees with 5 degree intervals. The matchers were executed between image 906 (i.e., the image with a 45 degree sun elevation) and the rest of the images 902, 904, and 908.

Figure 10:
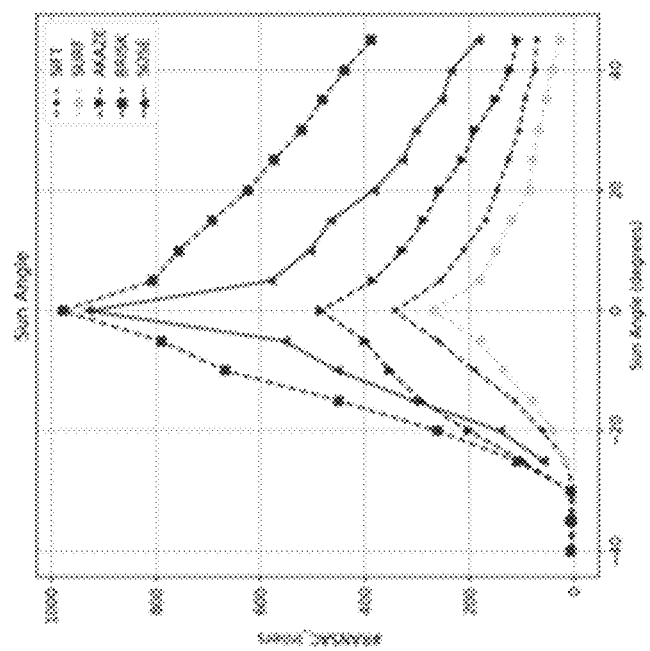
FIG. 10 illustrates a plot of a performance comparison between SOSE and other matchers in accordance with one or more embodiments of the invention.

FIG. 10 illustrates a plot of a performance comparison between SOSE and other matchers (with the sun angle on the horizontal axis and the random sample consensus (RANSAC) for inliers on the vertical axis). Overall, SOSE's performance is comparable to other SOA matchers. However, SOSE's advantage over other SOA matchers is the ease in which firmware may be implemented without loss of performance.

Figure 11:
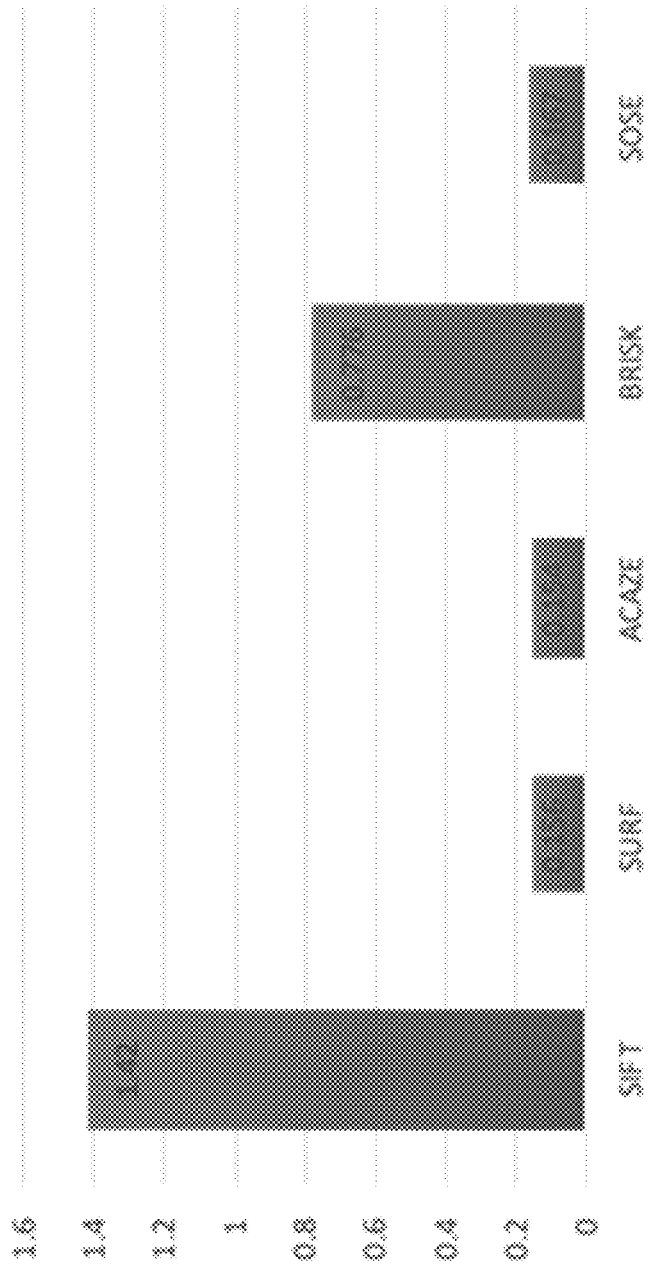
FIG. 11 illustrates the results of the speed test for five algorithms in accordance with one or more embodiments of the invention.

The speed of the five algorithms was also tested. FIG. 11 illustrates the results of the speed test for the five algorithms. As illustrated SOSE belongs to the fastest group of matchers with a speed very close to SURF and AKAZE and about 9 times faster than SIFT.

H-Matrix Pose Estimation with TRN Applications

Overview

As described above, an onboard TRN system carries a premade terrain map of a landing site to which the descent image is matched to estimate the spacecraft pose (both attitude and position). In the normal situation when the spacecraft attitude and altitude are known, feature matching, outlier rejection and pose estimation operations can be greatly simplified [Johnson]. However, when spacecraft state information is absent, the TRN problem complexity increases because the correspondence search is multi-dimensional (position+attitude) rather than a 2D search [Johnson]. In this case, descriptor-based feature matching becomes a viable solution [Owens]. A multi-dimensional search combined with a large search region introduces more outliers, making quick and reliable outlier rejection critical to algorithm performance.

Embodiments of the invention provide a novel outlier rejection and pose estimation algorithm for the TRN problem where the spacecraft state is not available (e.g., for a problem between image features and their counterparts in the 3D world where partial pose information is lacking). Such embodiments assume that the correspondences between the image and map have been identified and include false matches (outliers) requiring identification.

Embodiments of the invention simultaneously perform outlier rejection and pose estimation algorithm. Some of the traditional algorithms can only handle either outlier rejection or pose estimation. Therefore, such traditional algorithms take longer time to obtain the solution. Further, some of the algorithms need a good initial pose for converging to a final solution. Embodiments of the invention provide a closed form solution thereby guaranteeing a solution without any initial pose.

Such an improvement to the SOSE algorithm as described herein provides a universal solution for outlier rejection and pose estimation for any terrain types and environment for terrain relative navigation (TRN). The outlier rejection solution for existing spacecraft, such as Mars 2020 assumes spacecraft attitude and altitude are known. However, when this information is not available, prior art algorithms no longer work. Embodiments of the invention add a missing link to the overall TRN capability.

Embodiments of the invention provide a fast and robust approach for outlier rejection and pose estimation using a special property of camera pose and XY plane (Z=0). A normal pose procedure involves finding correspondents between the image features and their 3D counterparts in the world frame and then estimating the camera pose. However, the correspondent determination between the image and the 3D world often contains outliers which must be removed before the pose estimation is performed. Embodiments of the invention provide a simultaneous outlier rejection and pose estimation approach using a useful property of the relationship between the virtual plane and the camera pose. Further, embodiments of the invention provide a combination of a semi-linear solution and a closed form solution, and as such, has a more reliable solution compared to that of prior art algorithms. In addition, embodiments of the invention provide a solution that is faster than other surveyed solutions.

Compared to prior art software solutions, embodiments of the invention may provide one or more of the following advantages:
(1) The H matrix for a virtual Z=0 plane is relatively simple. It needs minimum 4 points to estimate 8 parameters. Although it is an iterative method, the convergence is very rapid and in normal cases, only takes a few iterations.
(2) The pose recovery from the H-Matrix is a closed formed solution.
(3) It uses less iterations for a success run. For example, it only needs about 70 iterations for a 99% success rate for a situation when the probability of inlier is 0.5. For other solutions, at least 4 times more iterations are required.

In view of the above, embodiments of the invention utilize an H-matrix with unique compensation for non-planar feature correspondences. A normal pose estimation procedure involves finding correspondences (feature matches) between the image features and their 3D counterparts in the world frame and then estimating the camera pose using the geometry of those correspondences. However, the set of feature correspondences between the image and 3D world often contains outliers which require removal before calculating the final pose estimation. Embodiments of the invention provide a simple outlier rejection and pose estimation approach using a convenient property between a virtual plane and the camera pose using the H-matrix formulation. Embodiments of the invention are faster and more robust than other solutions such as the F-matrix[Torr] or collinearity model [Photogrammetry] when using the RANdom Sample Consensus (RANSAC) [Fischler] technique.

H-Matrix Introduction

Let the camera position in the world frame be $C(c_x, c_y, c_z)$ and the rotation from world to the camera frame be cRw. Therefore, the transformation between a point in 3D world (P) to the camera frame can be expressed as $$\begin{pmatrix} x \\ y \\ 1 \end{pmatrix} \cong cRw(P - C) \qquad \text{Eq. (10)}$$

One can start the problem from the simple situation first. Let a point lie on a XY plane, where Z=0, then $P_0=(X_1, Y_1, 0)^T$.

Let $r_1, r_2, r_3$ be the three columns of cRw, $C_c = -_cR_wC_w$, and $P=(X, Y, 1)^T$, then we have $$\begin{pmatrix} x \\ y \\ 1 \end{pmatrix} \cong cRw(P_0 - C) = (r_1 \ r_2 \ C_c)P = HP = (h_1 \ h_2 \ h_3)P \qquad \text{Eq. (11)}$$

Clearly the first and second column of H are the first two columns of cRw and therefore their norm should be 1 and their dot product should be 0 as $$\|r_1\|=\|h_1\|=1 \|r_2\|=\|h_2\|=1 r_1 \cdot r_2 = h_1 \cdot h_2 = 0$$

This is a special case of homography between a Z=0 plane and the image plane and we name it H-Matrix.

For any estimate of the H-Matrix, $H_e$, we can recover a refined H-matrix by multiplying a scale factor using this property where:

$$H=sH_e \text{ for } s=2.0/(\|h_{e1}\|+\|h_{e2}\|)$$

This enforces on H that $\|h_1\| \approx \|h_2\| \approx 1$.

Given the orthonormality of the $h_1$ and $h_2$ column vectors of H, it follows that the camera position $C(c_x, c_y, c_z)$ can be derived from H using $$A = H^T H = \begin{pmatrix} a_{11} & a_{12} & a_{13} \\ a_{21} & a_{22} & a_{23} \\ a_{31} & a_{32} & a_{33} \end{pmatrix} = \begin{pmatrix} 1 & 0 & -c_x \\ 0 & 1 & -c_y \\ -c_x & -c_y & \|C\|^2 \end{pmatrix} \qquad \text{Eq. (12)}$$

Matrix A contains camera position terms only. The conditions of $\alpha_{12}=\alpha_{21}=0$, $\alpha_{11}=1$, $\alpha_{22}=1$ and $\alpha_{33}-c_x^2-c_y^2>0$ can be used to validate the H-matrix condition. When a H-Matrix fails this condition check, it indicates that the input data is either ill conditioned (e.g., all points are colinear or wrong) or the input contains outliers. In this case, this H matrix may be abandoned and the algorithm moves to another data set.

When it passes the check, it follows from simple algebra that there are two mirrored solutions as $$(-a_{13}-a_{23}\pm 2\sqrt{a_{33}-c_x^2-c_y^2}) \qquad \text{Eq. (13)}$$

The true solution can be selected based on constraints imposed by the application, such as the camera must be above the surface of the ground.

Then the rotation can be obtained as:

$$cRw=H(I-CN^T)^{-1} \qquad \text{Eq. (14)}$$

where N=(0, 0, 1);

H-Matrix (H) for a General Case where 3D Points are not Coplanar

Let's assume a set of points between an image and world has been found $\{p_i\} \to \{P_i\}$, where lower case p is the point on the image and upper case P is the 3D point in world frame. It can further be assumed that more than four (4) points are found (10s to 100s of points).

For a given set of 3D points, one can easily find a translation $P_m$ and rotation $_lR_w$ to convert those points into a local coordinate frame where the Z axis is aligned with the smallest eigenvector of the point clouds.

As $P_i' = lRw(P_i - P_m)$

First, let all Z value of $\{P_i'\}$ be 0, so that an H-Matrix ($H_0$) can be constructed by these points via a least-squares method.

One can then obtain an initial pose from the $H_0$-Matrix ($cRl_0$, $C_0$) using Eq. (13)-(14).

For any given point in $\{P_i'\}P'(X', Y', Z')$, the point may be separated into two components as $P'=P'_0+P_Z$ where $P'_0=(X', Y', 0)$ and $P_Z=(0, 0, Z')$, such that the equation can be rewritten as $$\begin{pmatrix} x \\ y \\ 1 \end{pmatrix} \cong cRl(P' - C) = cRl(P_0 - C) + cRlP_z = c(r_1 \ r_2 \ C_c)P_0 + P_{zc} \text{ where}$$

$$P_{zc} = {_cR_w}P_z.$$

The first part of the equation is the H-Matrix for plane Z=0 and the second component is the compensation component due to nonplanarity of those 3D points. Because an initial $_cR_{w0}$ is obtained already, the compensation component can be approximated by $P_{zc}=cRl_0P_Z$. Then, the updated H-Matrix can be constructed using a regular method after adding the compensation. However, the compensation has to be scaled by $s=1/h_{33}$.

In view of the above, the following procedural method may be used for pose estimation:

1. For a given set of 3D points, find a rotation and translation to convert the 3D points into the local frame;
2. Use the x and y components of the 3D points (in the local frame) to construct a H-Matrix and compute the initial pose ($cRl_0$, and $Cl_0$);
3. Reconstruct a new H-Matrix by adding the compensation component $P_{zc}$;
4. Compute the pose using the newly compensated H-Matrix;
5. Compute the reprojection error of 3D points;
6. If the reprojection error is less than tolerance, go to the next step, otherwise iterate back to step 3;
7. Convert the pose from the local frame to the world frame.

Normally, this convergence is very fast requiring only a few iterations. Because the H-Matrix only needs a minimum of 4 points, it is an ideal choice for outlier rejection to reduce computational overhead. For example, embodiments may use the well-known RANSAC method with 4 randomly selected points in each iteration. Compared to other commonly used methods: the collinearity (CL) model needs a minimum 6 points, and F-Matrix which needs 8 points. Accordingly, the H-matrix can significantly reduce the number of iterations as shown in Table 1 for varying probabilities of good matches in the data set provided.

TABLE 1

| P(inlier) | H-matrix | CL | F-Matrix |
|---|---|---|---|
| 0.9 | 4 | 6 | 8 |
| 0.8 | 9 | 15 | 25 |
| 0.7 | 17 | 37 | 78 |
| 0.6 | 33 | 96 | 272 |
| 0.5 | 71 | 292 | 1177 |
| 0.4 | 178 | 1122 | 7025 |
| 0.3 | 566 | 6315 | 70188 |

In this regard, Table 1 provides the number of RANSAC convergence iterations required for a given probability of good matches in a data set (P(inlier)).

In view of the above, embodiments of the invention provide a novel iterative algorithm using H-matrix pose estimation that compensates for non-planar 3D points. This new method may have one or more of the following advantages:

(1) It is simple and robust.
(2) Its solution accuracy is equivalent to other well-known pose estimation solutions.
(3) Because it needs minimum 4 points, it is an ideal solution for outlier rejection. Specifically, it is particularly useful for outlier rejection in TRN applications.

Blockwise Outlier Rejection Scheme for Efficient Image to Map Matching

As described above, terrain relative navigation (TRN) has become an important capability for spacecraft landing precisely on another planetary body. The onboard TRN system carries a premade terrain map of landing site and then the descent image is matched to the reference map to estimate the spacecraft pose (both attitude and position). When the spacecraft attitude and altitude are known, the TRN algorithm can be done by a simple spatial correlation method because the descent image can be rectified to the map frame and the image to map matching can be done by a simple correlation method. However, when spacecraft pose (both position and attitude) is absent or known imperfectly, a different TRN algorithm has to be used. Because of the need for scale and orientation invariance, descriptor based feature selection/matching algorithms are the natural choice for TRN and spacecraft landing.

Figure 12:
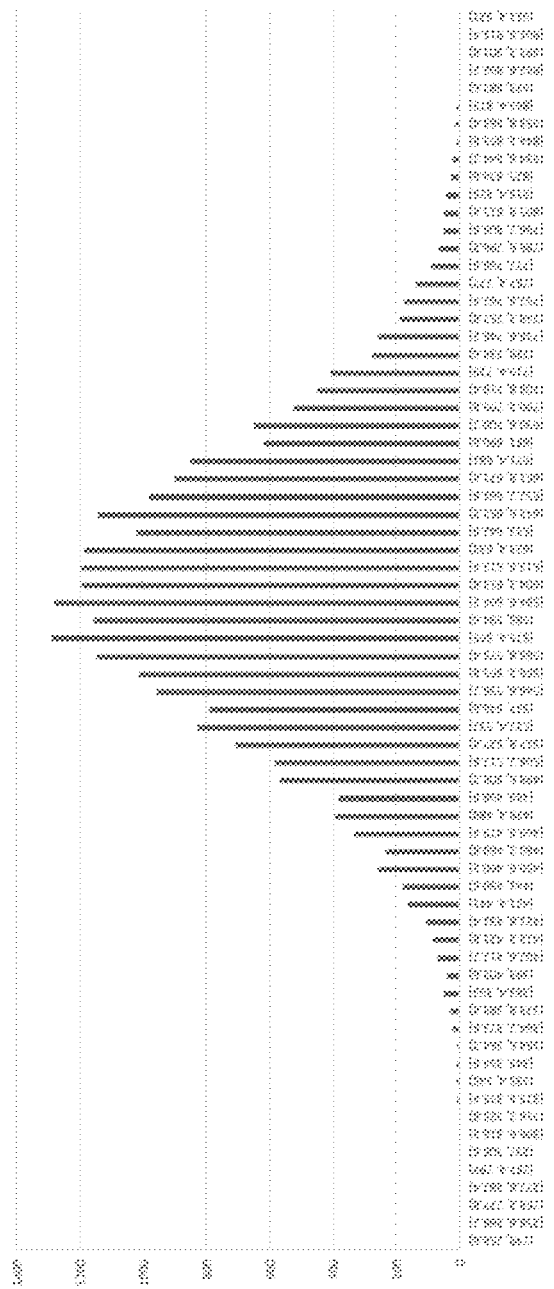
FIG. 12 illustrates a histogram of Manhattan distances of features rejected using the H-matrix in accordance with one or more embodiments of the invention.

As described above, embodiments of the invention utilize SOSE (and the H-matrix algorithm) to perform the image mapping. However, since SOSE uses a smaller descriptor array (64, vs traditional 128 elements) to record the local image patch properties, the descriptors are not always unique and distinguishable enough to ensure a good match. This problem becomes more prominent when a descent image is matched to a very large map. The areal coverage ratio could be 100 or more and often two or more features could have similar descriptors—resulting in mismatching or confusion and a reduced number of matched features. Normally, when about 1000 features are selected from an image and about 100,000 or more features are selected from the map, the likelihood that a feature in an image has one or more wrong features with similar descriptors is too high to be neglected. In this regard, FIG. 12 illustrates a histogram of Manhattan distances of features rejected using the H-matrix in accordance with one or more embodiments of the invention.

As described above, the traditional feature matching algorithm often show performance degradation when the number of input map features gets larger. More specifically, the traditional descriptor feature matching uses the best to the second-best feature distance ratio as the first step in outlier rejection features. Such a scheme is simple and effective when two images have a similar size and scale. However, when the number of features in the map is two (2) or more magnitudes larger, the best/second best feature distance ratio becomes less and less effective and even stops working eventually.

To overcome these problems, embodiments of the invention provide a blockwise outlier rejection algorithm that is designed based on two observations from studying the image to map matching behavior: (1) Only a small number of features could have similar descriptors within a small image neighborhood; and (2) Two or more neighboring features form a constellation which is less likely to be confused with other constellations or individual features. Using a blockwise outlier rejection scheme, the percentage of indistinguishable feature pairs can be significantly reduced.

Figure 13:
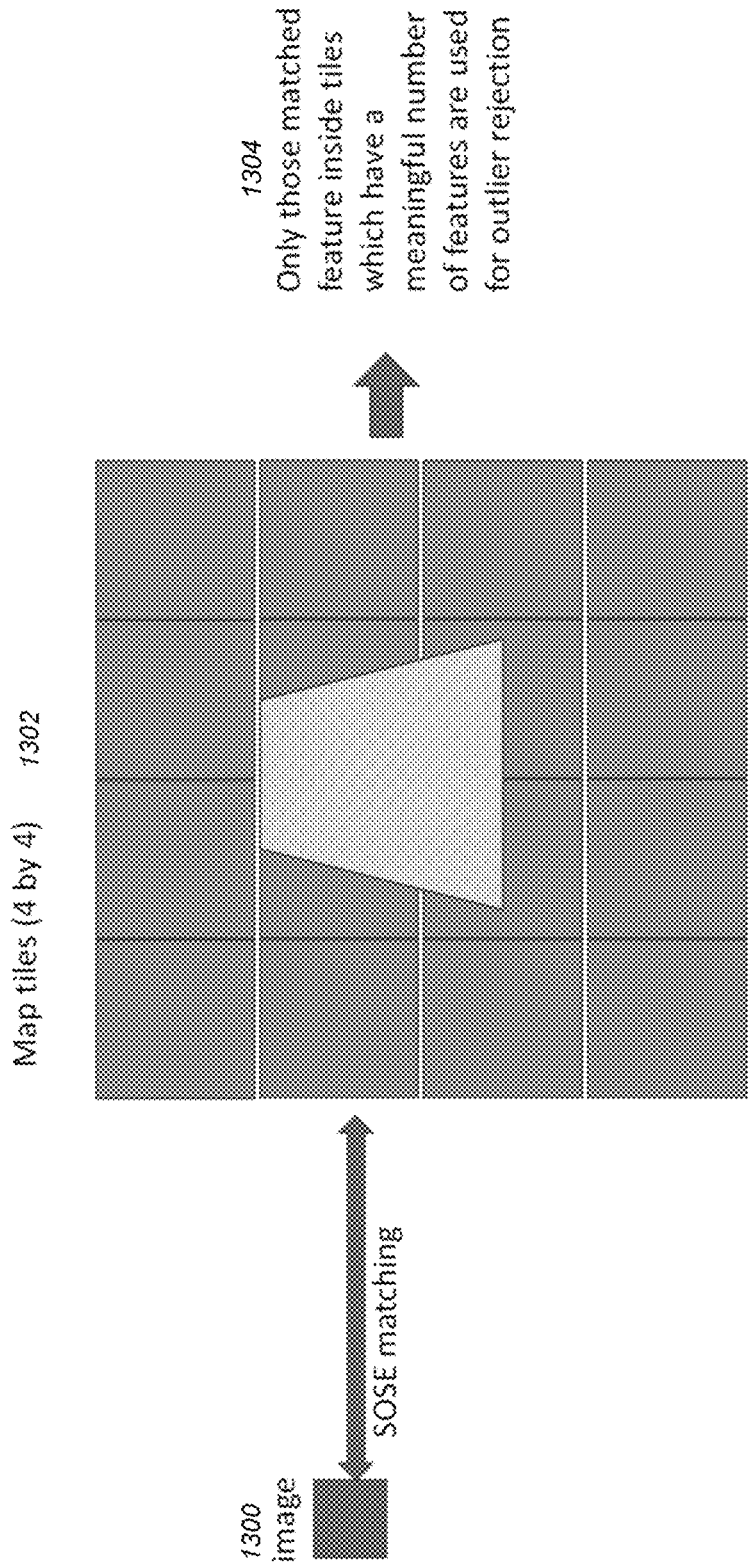
FIG. 13 illustrates a logical flow for performing an image to map blockwise matching scheme in accordance with one or more embodiments of the invention.

In view of the above, embodiments of the invention provide a new blockwise algorithm. FIG. 13 illustrates a logical flow for performing the image to map blockwise matching scheme in accordance with one or more embodiments of the invention. The steps performed are as follows:

(1) Divide the map region into fixed size block (e.g., 1 k by 1 k). In FIG. 13, the map region 1302 is broken into blocks as map tiles (i.e., 4 by 4).
(2) For any feature in the image 1300, find and keep its best and second-best feature in the map database/map region 1302.
(3) Count how many best and second-best feature are in each block (1 k by 1 k);
(4) Find the block that has highest total count of the best and second-best features;
(5) Find all neighboring blocks that have an unusually high number of counts (e.g., blocks that neighbor the peak block and that meet a threshold minimum total count;
(6) Extract all of the features from the peak block and identified neighbor blocks; and
(7) Discard all features in the remaining blocks. In other words, at 1304, only those matched features inside tiles that have a meaningful number of features are used and the rest are discarded/rejected as outliers.

This new approach solves the degradation problem described above and also improves feature matching performance. Compared to the traditional approach, this new approach has improved the recall rate (how many input features are paired with their counterparts in another database) by 30%.

In view of the above, embodiments of the invention provide a blockwise outlier rejection scheme, which can effectively solve the degradation problem while also improving the feature matching performance. Compared to the prior art systems, embodiments of the invention improve the recall rate (i.e., how many input features are paired with their counterparts in another database) by 30%. The idea behind this new approach is based on the following intuitions: A constellation consisting of two or more local feature constellations has a significantly more distinguishable signature than individual descriptors. Such a blockwise filter takes this intuition into a smart data booking scheme, which can quickly identify most of the wrong matchings and block them from future process. Then the number of outliers for the outlier rejection algorithm as disclosed earlier in this document, is significantly reduced.

Logical Flow

Figure 14:
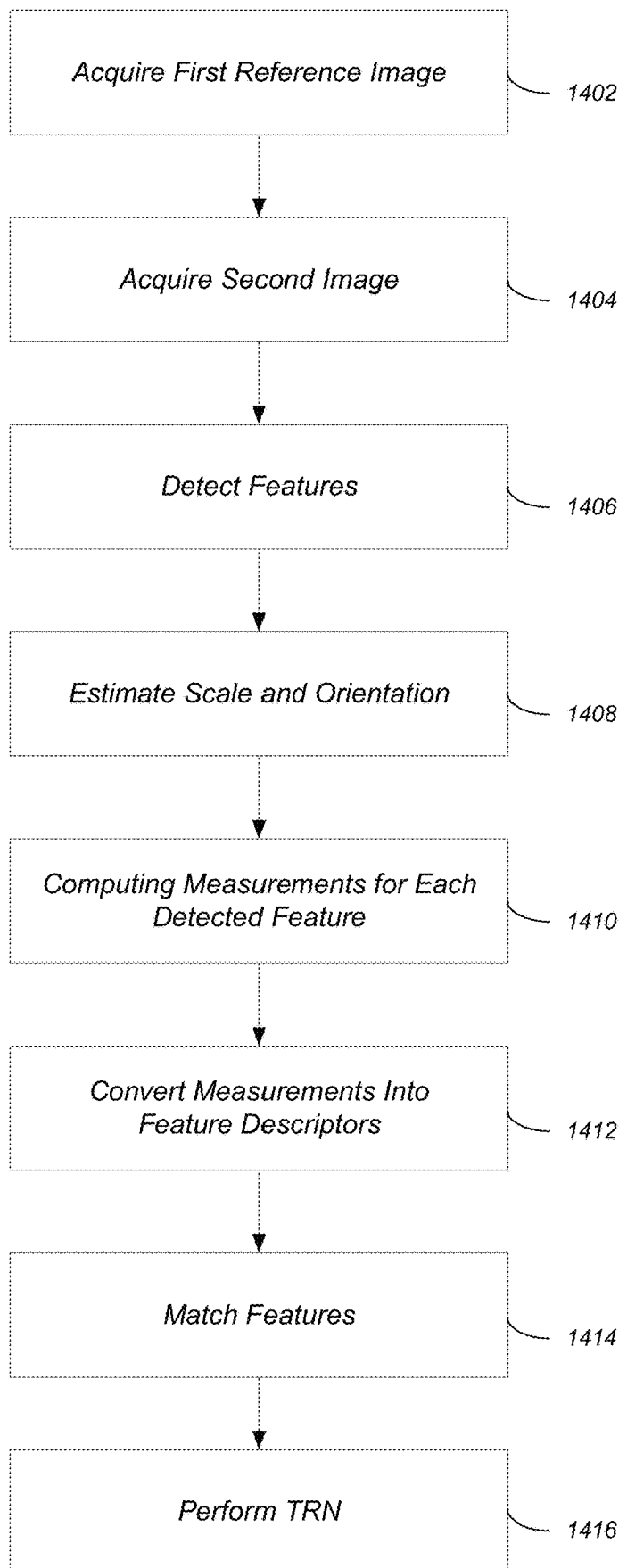
FIG. 14 illustrates the logical flow for performing descriptor-based feature mapping during terrain relative navigation (TRN) in accordance with one or more embodiments of the invention.

FIG. 14 illustrates the logical flow for performing descriptor-based feature mapping during terrain relative navigation (TRN) in accordance with one or more embodiments of the invention.

At step 1402, a reference map is acquired (and constructed) over the landing site or flight path using satellite imagery data. In one or more embodiments, the reference map is a premade terrain map of a first scene. Further steps below provide for detecting the SOSE features and extracting their descriptors to form a SOSE feature database.

At step 1404, a second (terrain) image of the first scene is acquired from a vehicle that is above the terrain of the first scene. In other words, the second image is of the terrain beneath the landing site or flight path.

A step 1406, one or more (SOSE) features in the first reference image and second (terrain) image are detected.

At step 1408, a feature scale and a feature orientation of the one or more detected features are estimated. Such an estimation includes: (1) the determination of an intensity centroid (IC) based on moments of the one or more detected features; (2) the determination of the feature scale based on the IC; and (3) the determination of a feature orientation for each of the one or more detected features based on an angle between a center of each of the one or more detected features and the IC. In one or more embodiments, the feature orientations for each of the one or more detected features are based on a corresponding orientation stability measure for each of the one or more detected features. The orientation stability measure is based on a radius, that in turn is determined by (i) beginning with an initial radius; and (ii) increasing the initial radius until the orientation stability measure stabilizes, wherein upon the orientation stability measure stabilizing, a stable scale and stable orientation for the IC results.

In one or more embodiments, the moments (m) of the one or more detected features (p and q) are defined as:

$$m_{pq} = \sum_{x,y} x^p y^q I(x, y),$$

the IC of the detected one or more features is:

$$IC = \left(\frac{m_{01}}{m_{00}}, \frac{m_{10}}{m_{00}}\right),$$

and
the orientation for the one or more detected features is:

$$\theta = a\tan 2(m_{01}, m_{10}).$$

In one or more embodiments, the orientation stability measure $M_1$ for each detected feature $p(x,y)$ based on radius r is:

$$M_1(r) = \left[\left(\frac{\partial \theta}{\partial x}\right)^2 + \left(\frac{\partial \theta}{\partial y}\right)^2\right](x^2 + y^2) < r^2.$$

In one or more embodiments, the orientation of the one or more detected features is stable spatially within the radius of a center of one or more detected features.

In one or more embodiments of the invention, the estimating further includes the computation of a second orientation stability measure $M_2(r)$ is defined as:

$$M_2(r) = \tan(\theta(r) - \theta(r + dr)) = \tan\left(\arctan\left(\frac{\sum_r xI}{\sum_r yI}\right) - \arctan\left(\frac{\sum_{r+dr} xI}{\sum_{r+dr} yI}\right)\right) = $$

$$\frac{\sum_r xI \sum_{r+dr} xI - \sum_r yI \sum_{r+dr} xI}{\sum_r xI \sum_{r+dr} xI + \sum_r yI \sum_{r+dr} yI} < d\Theta$$

where x and y are coordinates and I is the image value at (x,y).

At step 1410, signatures are computed for each of the one or more detected features using the estimated scale and orientation.

At step 1412, each of the signature is converted into a feature descriptor corresponding to each of the one or more detected features. The one or more detected features identified in both the reference map and the second image, based on the feature descriptors, are repeatable such that a minimum threshold number of the one or more detected features are detected in both the reference map and the second image. Further, the estimated scale of the one or more detected features is within an accuracy threshold level. In addition, the detection of the one or more features in the second image allows for time-critical applications.

At step 1414, the feature descriptors are used to match features from the reference map to the second image. Such feature matching may also include the removal/rejection of outlier matches (e.g., incorrect matches).

In one or more embodiments, removing outlier matches may include determining an estimated H-matrix based on four (4) input points, where the estimated H-matrix is based on a collinearity equation comprising a case of homography between a Z=0 plane and an image plane. A refined H-matrix may then be determined by multiplying the estimated H-matrix by a scale factor. Thereafter, a camera position may be determined from the refined H-matrix.

The removal of outlier matches may further include (i) for a given set of points, determining a rotation and translation to convert them into a local frame; (ii) using x and y components of the given set of points, in the local frame, to construct the estimated H-matrix and compute an initial pose; (iii) adding a compensation component to the initial pose to compute the full H-matrix; (iv) computing a final pose using the full H-matrix; (v) computing a reprojection error of the given set of points; (vi) upon determining that the reprojection error is not less than a tolerance, iterating back to step (iii); and (vii) converting the final pose from the local frame to a world frame.

Further to the above, utilizing the feature descriptors to match features may include dividing the first reference image into fixed size blocks, matching features from the second image to features in the first reference image, determining which fixed size blocks contain a threshold minimum number of matched features, and only utilizing the matched features inside the fixed size blocks that contain the threshold minimum number of matched features to perform the TRN. In this regard, details for such blockwise processing to remove outliers may also include: for any feature in the second image, finding a best feature and a second best feature in the first reference image; counting a total count of best features and second best features in each fixed size block; finding the peak fixed size block as the fixed size block with a highest total count; finding all neighboring fixed size blocks that have a threshold minimum total count; extracting all features from the peak fixed size block and the neighboring fixed size blocks; and discarding features from remaining fixed size blocks as outliers.

At step 1816, the matched features are utilized to perform TRN.

Hardware Description

Figure 15:
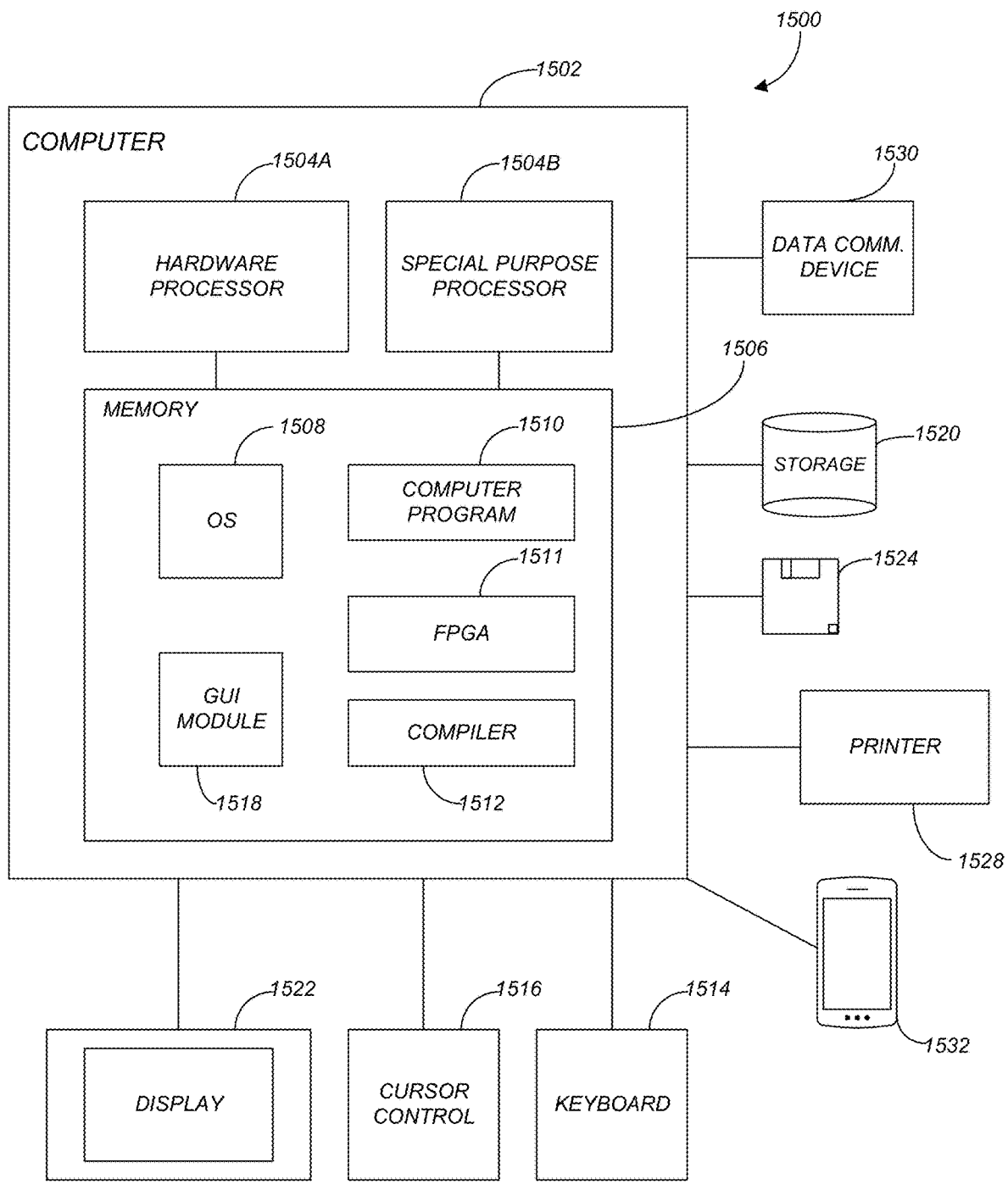
FIG. 15 is an exemplary hardware and software environment used to implement one or more embodiments of the invention.

FIG. 15 is an exemplary hardware and software environment 1500 (referred to as a computer-implemented system and/or computer-implemented method) used to implement one or more embodiments of the invention. The hardware and software environment includes a computer 1502 and may include peripherals. Computer 1502 may be a user/client computer, server computer, or may be a database computer. The computer 1502 comprises a hardware processor 1504A and/or a special purpose hardware processor 1504B (hereinafter alternatively collectively referred to as processor 1504) and a memory 1506, such as random access memory (RAM). The computer 1502 may be coupled to, and/or integrated with, other devices, including input/output (I/O) devices such as a keyboard 1514, a cursor control device 1516 (e.g., a mouse, a pointing device, pen and tablet, touch screen, multi-touch device, etc.) and a printer 1528. In one or more embodiments, computer 1502 may be coupled to, or may comprise, a portable or media viewing/listening device 1532 (e.g., an MP3 player, IPOD, NOOK, portable digital video player, cellular device, personal digital assistant, etc.). In yet another embodiment, the computer 1502 may comprise a multi-touch device, mobile phone, gaming system, internet enabled television, television set top box, or other internet enabled device executing on various platforms and operating systems.

In one embodiment, the computer 1502 operates by the hardware processor 1504A performing instructions defined by the computer program 1510 (e.g., a computer-aided design [CAD] application) under control of an operating system 1508. In alternative embodiments, the logic of the computer 1502 and/or the computer itself may be programmed/operated by a Field Programmable Gate Array (FPGA) 1511. The FPGA 1511, computer program 1510 and/or the operating system 1508 may be stored in the memory 1506 and may interface with the user and/or other devices to accept input and commands and, based on such input and commands and the instructions defined by the computer program 1510 and operating system 1508, to provide output and results.

Output/results may be presented on the display 1522 or provided to another device for presentation or further processing or action. In one embodiment, the display 1522 comprises a liquid crystal display (LCD) having a plurality of separately addressable liquid crystals. Alternatively, the display 1522 may comprise a light emitting diode (LED) display having clusters of red, green and blue diodes driven together to form full-color pixels. Each liquid crystal or pixel of the display 1522 changes to an opaque or translucent state to form a part of the image on the display in response to the data or information generated by the processor 1504 from the application of the instructions of the computer program 1510 and/or operating system 1508 to the input and commands. The image may be provided through a graphical user interface (GUI) module 1518. Although the GUI module 1518 is depicted as a separate module, the instructions performing the GUI functions can be resident or distributed in the operating system 1508, the computer program 1510, or implemented with special purpose memory and processors.

In one or more embodiments, the display 1522 is integrated with/into the computer 1502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1502 according to the computer program 1510 instructions may be implemented in a special purpose processor 1504B. In this embodiment, some or all of the computer program 1510 instructions may be implemented via firmware instructions stored in a read only memory (ROM), a programmable read only memory (PROM) or flash memory within the special purpose processor 1504B or in memory 1506. The special purpose processor 1504B may also be hardwired through circuit design to perform some or all of the operations to implement the present invention. Further, the special purpose processor 1504B may be a hybrid processor, which includes dedicated circuitry for performing a subset of functions, and other circuits for performing more general functions such as responding to computer program 1510 instructions. In one embodiment, the special purpose processor 1504B is an application specific integrated circuit (ASIC).

The computer 1502 may also implement a compiler 1512 that allows an application or computer program 1510 written in a programming language such as C, C++, Assembly, SQL, PYTHON, PROLOG, MATLAB, RUBY, RAILS, HASKELL, or other language to be translated into processor 1504 readable code. Alternatively, the compiler 1512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1510 accesses and manipulates data accepted from I/O devices and stored in the memory 1506 of the computer 1502 using the relationships and logic that were generated using the compiler 1512.

The computer 1502 also optionally comprises an external communication device such as a modem, satellite link, Ethernet card, or other device for accepting input from, and providing output to, other computers 1502.

In one embodiment, instructions implementing the operating system 1508, the computer program 1510, and the compiler 1512 are tangibly embodied in a non-transitory computer-readable medium, e.g., data storage device 1520, which could include one or more fixed or removable data storage devices, such as a zip drive, floppy disc drive 1524, hard drive, CD-ROM drive, tape drive, etc. Further, the operating system 1508 and the computer program 1510 are comprised of computer program 1510 instructions which, when accessed, read and executed by the computer 1502, cause the computer 1502 to perform the steps necessary to implement and/or use the present invention or to load the program of instructions into a memory 1506, thus creating a special purpose data structure causing the computer 1502 to operate as a specially programmed computer executing the method steps described herein. Computer program 1510 and/or operating instructions may also be tangibly embodied in memory 1506 and/or data communications devices 1530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1502.

Conclusion

This concludes the description of the preferred embodiment of the invention. In summary, embodiments of the invention provide a novel approach for feature scale and orientation estimation which is referred to herein as "SOSE." Experimental studies show SOSE is a very effective approach for feature selection. Although SOSE's performance may be slightly worse than the classic algorithm such as SIFT, such performance issues are primarily caused by a gridded feature selection rather than SOSE itself. Embodiments of the invention avoid the need for a pyramid scheme for scale estimation and as a result, it is both faster and requires less data access than other approaches. In addition, embodiments of the invention are easy to parallelize on FPGA or other embedded systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Lowe] David G. Lowe, "Distinctive image features from scale-invariant key points," *International Journal of Computer Vision*, 60, 2 (2004), pp. 91-110.

[Rosin] P. L. Rosin. Measuring corner properties. *Computer Vision and Image Understanding* 73(2):291-307, 1999.

[Bay] Bay, H., Tuytelaars, T., Van Gool, L. (2006). SURF: Speeded Up Robust Features. In: Leonardis, A., Bischof, H., Pinz, A. (eds) Computer Vision—ECCV 2006. ECCV 2006. Lecture Notes in Computer Science, vol 3951. Springer, Berlin, Heidelberg. https://doi.org/10.1007/11744023_32.

[Koenderink] Koenderink, J. K, 1984. The structure of images. Biological Cybernetics, 50:363-396.

[Lindeberg] Lindeberg, T. 1994. Scale-space theory: A basic tool for analyzing structures at different scales. Journal of Applied Statistics, 21(2):224-270.

[Mikolajcyk] Mikolajcyk, K., and Schmidt, C. 2002. An affine invariant interest point detector. ECCV 2002, Copenhagen, Denmark, pp. 128-142.

[Rublee] Rublee, E., et al., "ORB: An efficient alternative to SIFT or SURF," ICCV 2011, pp. 2564-2571.

[Alcantarilla] Alcantarilla, P. F., Bartoli, A, and Davison, A. J., "KAZE Features," ECCV 2012, pp. 214-227.

[Brown] Brown, Matthew, Richard Szeliski, and Simon Winder. "Multi-image matching using multi-scale oriented patches." 2005 *IEEE Computer Society Conference on Computer Vision and Pattern Recognition* (CVPR'05). Vol. I. IEEE, 2005.

[Mikolajczyk] Krystian Mikolajczyk and Cordelia Schmid. Scale and invariant interest point detectors. IJCV, 60(1): 63-86, 2004.

[Johnson] Andrew Johnson et al, Mars2020 Lander Vision System Flight Performance, SciTech 2022 Forum. https://doi.org/10.2514/6.2022-1214

[Owens] Chris Owens, et al., "Development of a Signature-based Terrain Relative Navigation System for Precision Landing," AIAA 2021-0376. *AIAA Scitech* 2021 *Forum*. January 2021.

[Ansar] Adnan Ansar & Kostas Daniilidis, "Linear pose estimation from points or lines", IEEE PAMI, vol. 25, No. 5, 2003.

[Torr] Torr, Philip H S, and David William Murray. "The development and comparison of robust methods for estimating the fundamental matrix." *International Journal of Computer Vision* 24.3 (1997): 271-300.

[Photogrammetry] Manual of Photogrammetry, ASPRS, 5th Ed., 2004. pp. 280, 498.

[Fischler] Martin A. Fischler and Robert C. Bolles. 1981. "Random sample consensus: a paradigm for model fitting with applications to image analysis and automated cartograph", Commun. ACM 24, 6 (June 1981).

[Agarwal] M. Agrawal, K. Konolige, and M. R. Blas, "CenSurE: Center surround extremas for real time feature detection and matching", Lecture Notes in Computer Science, vol. 5305, 2008, pp. 102-115.

What is claimed is:

1. A method for descriptor-based feature mapping during terrain relative navigation (TRN), comprising:
   (a) acquiring a reference map comprising a premade terrain map of a first scene;
   (b) acquiring a second image of the first scene from a vehicle that is above a terrain of the first scene;
   (c) detecting one or more features in the reference map and the second image;
   (d) estimating a feature scale and a feature orientation of the one or more detected features by:
      (1) determining an intensity centroid (IC) based on moments of the one or more detected features;
      (2) determining the feature scale based on the IC;
      (3) determining the feature orientation for each of the one or more detected features based on an angle between a center of each of the one or more detected features and the IC;
      wherein:
         (i) the feature orientations for each of the one or more detected features are based on a corresponding orientation stability measure for each of the one or more detected features; and
         (ii) the orientation stability measure is based on a radius, wherein the radius is determined by:
            (A) beginning with an initial radius;
            (B) increasing the initial radius until the orientation stability measure stabilizes, wherein upon the orientation stability measure stabilizing, a stable scale and stable orientation for the IC result;
   (e) computing signatures for each of the one or more detected features using the estimated feature scale and feature orientation;
   (f) converting each of the signatures into a feature descriptor corresponding to each of the one or more detected features, wherein:

(1) the one or more detected features identified in both the reference map and the second image, based on the feature descriptors, are repeatable such that a minimum threshold number of the one or more detected features are detected in both the reference map and the second image;
(2) the estimated scale of the one or more detected features is within an accuracy threshold level;
(3) the detecting of the one or more features in the second image allows for time-critical applications;
(g) utilizing the feature descriptors to match features from the reference map to the second image; and
(h) utilizing the matched features to perform TRN.

2. The method of claim 1, wherein:
the moments (m) of the one or more detected features (p and q) are defined as:

$$m_{pq} = \sum_{x,y} x^p y^q I(x,y)$$

x is a column distance to a patch center, y is a row distance to the patch center, and I(x,y) is an image intensity;
the IC of the detected one or more features is:

$$IC = \left(\frac{m_{01}}{m_{00}}, \frac{m_{10}}{m_{00}}\right),$$

and
the feature orientation for each of the one or more detected features is:
$\theta = a\tan2(m_{01}, m_{10})$.

3. The method of claim 1, wherein:
the orientation stability measure $M_1$ for each detected feature p(x,y) based on radius r is $$M_1(r) = \left[\left(\frac{\partial \theta}{\partial x}\right)^2 + \left(\frac{\partial \theta}{\partial y}\right)^2\right](x^2 + y^2) < r^2.$$

4. The method of claim 1, wherein:
the feature orientation of each of the one or more detected features is stable spatially within the radius of a center of one or more detected features.

5. The method of claim 1, wherein:
a second orientation stability measure $M_2(r)$ is defined as:

$$M_2(r) = \tan(\theta(r) - \theta(r+dr)) = \tan\left(\arctan\left(\frac{\sum_r xI}{\sum_r yI}\right) - \arctan\left(\frac{\sum_{r+dr} xI}{\sum_{r+dr} yI}\right)\right) = \frac{\sum_r xI \sum_{r+dr} xI - \sum_r yI \sum_{r+dr} xI}{\sum_r xI \sum_{r+dr} xI + \sum_r yI \sum_{r+dr} yI} < d\Theta.$$

6. The method of claim 1, further comprising removing outlier false matches by:
determining an estimated H-matrix based on four (4) input points, wherein the estimated H-matrix is based on a collinearity equation comprising a case of homography between a Z=0 plane and an image plane;
determining a refined H-matrix by multiplying the estimated H-matrix by a scale factor; and
determining a camera position from the refined H-matrix.

7. The method of claim 6, further comprising:
(i) for a given set of points, determining a rotation and translation to convert them into a local frame;
(ii) using x and y components of the given set of points, in the local frame, to construct the estimated H-matrix and compute an initial pose;
(iii) adding a compensation component to the initial pose to compute the refined H-matrix;
(iv) computing a final pose using the refined H-matrix;
(v) computing a reprojection error of the given set of points;
(vi) upon determining that the reprojection error is not less than a tolerance, iterating back to step (iii); and
(vii) converting the final pose from the local frame to a world frame.

8. The method of claim 1, wherein the utilizing the feature descriptors to match features comprises:
dividing the reference map into fixed size blocks;
matching features from the second image to features in the reference map;
determining which fixed size blocks contain a threshold minimum number of matched features; and
only utilizing the matched features inside the fixed size blocks that contain the threshold minimum number of matched features to perform the TRN.

9. The method of claim 8, further comprising:
for any feature in the second image, finding a best feature and a second best feature in the reference map;
counting a total count of best features and second best features in each fixed size block;
finding a peak fixed size block as the fixed size block with a highest total count;
finding all neighboring fixed size blocks that have a threshold minimum total count;
extracting all features from the peak fixed size block and the neighboring fixed size blocks; and
discarding features from remaining fixed size blocks as outliers.

10. A terrain relative navigation (TRN) system, comprising:
(a) a memory that is accessible and used to perform navigation, wherein the memory stores:
(1) a reference map comprising a premade terrain map of a first scene; and
(2) a field programmable gate array (FPGA); and
(b) the FPGA stored in the memory, wherein logic of the FPGA:
(1) acquires a second image of the first scene from a vehicle that is above a terrain of the first scene;
(2) detects one or more features in the reference map and the second image;
(3) estimates a feature scale and a feature orientation of the one or more detected features by:
(i) determining an intensity centroid (IC) based on moments of the one or more detected features;
(ii) determining the feature scale based on the IC; and
(iii) determining the feature orientation for each of the one or more detected features based on an angle between a center of each of the one or more detected features and the IC;
wherein:
(A) the feature orientations for each of the one or more detected features are based on a corresponding orientation stability measure for each of the one or more detected features;

(B) the orientation stability measure is based on a radius, wherein the radius is determined by:
(i) beginning with an initial radius;
(ii) increasing the initial radius until the orientation stability measure stabilizes, wherein upon the orientation stability measure stabilizing, a stable scale and stable orientation for the IC result;
(4) computes signatures for each of the one or more detected features using the estimated feature scale and feature orientation;
(5) converts each of the signatures into a feature descriptor corresponding to each of the one or more detected features, wherein:
(i) the one or more detected features identified in both the reference map and the second image, based on the feature descriptors, are repeatable such that a minimum threshold number of the one or more detected features are detected in both the reference map and the second image;
(ii) the estimated scale of the one or more detected features is within an accuracy threshold level;
(iii) the detecting of the one or more features in the second image allows for time-critical applications;
(6) utilizes the feature descriptors to match features from the reference map to the second image; and
(7) utilizes the matched features to perform TRN.

11. The TRN system of claim 10, wherein:
the moments (m) of the one or more detected features (p and q) are defined as:

$$m_{pq} = \sum_{x,y} x^p y^q I(x, y)$$

x is a column distance to a patch center, y is a row distance to the patch center, and I(x,y) is an image intensity;
the IC of the detected one or more features is:

$$IC = \left(\frac{m_{01}}{m_{00}}, \frac{m_{10}}{m_{00}}\right),$$

and
the feature orientation for each of the one or more detected features is:

$$\theta = a\tan2(m_{01}, m_{10}).$$

12. The TRN system of claim 10, wherein:
the orientation stability measure $M_1$ for each detected feature p(x,y) based on radius r is $$M_1(r) = \left[\left(\frac{\partial \theta}{\partial x}\right)^2 + \left(\frac{\partial \theta}{\partial y}\right)^2\right](x^2 + y^2) < r^2.$$

13. The TRN system of claim 10, wherein:
the feature orientation of each of the one or more detected features is stable spatially within the radius of a center of one or more detected features.

14. The TRN system of claim 10, wherein:
a second orientation stability measure $M_2(r)$ is defined as:

$$M_2(r) = \tan(\theta(r) - \theta(r+dr)) = \tan\left(\arctan\left(\frac{\sum_r xI}{\sum_r yI}\right) - \arctan\left(\frac{\sum_{r+dr} xI}{\sum_{r+dr} yI}\right)\right) =$$

$$\frac{\sum_r xI \sum_{r+dr} xI - \sum_r yI \sum_{r+dr} xI}{\sum_r xI \sum_{r+dr} xI + \sum_r yI \sum_{r+dr} yI} < d\theta.$$

15. The TRN system of claim 10, wherein the logic of the FPGA further removes outlier false matches by:
determining an estimated H-matrix based on four (4) input points, wherein the estimated H-matrix is based on a collinearity equation comprising a case of homography between a Z=0 plane and an image plane;
determining a refined H-matrix by multiplying the estimated H-matrix by a scale factor; and
determining a camera position from the refined H-matrix.

16. The TRN system of claim 15, wherein the logic of the FPGA further:
(i) for a given set of points, determines a rotation and translation to convert them into a local frame;
(ii) uses x and y components of the given set of points, in the local frame, to construct the estimated H-matrix and compute an initial pose;
(iii) adds a compensation component to the initial pose to compute the refined H-matrix;
(iv) computes a final pose using the refined H-matrix;
(v) computes a reprojection error of the given set of points;
(vi) upon determining that the reprojection error is not less than a tolerance, iterates back to step (iii) adding a compensation component; and
(vii) converts the final pose from the local frame to a world frame.

17. The TRN system of claim 10, wherein the FPGA utilizes the feature descriptors to match features by:
dividing the reference map into fixed size blocks;
matching features from the second image to features in the reference map;
determining which fixed size blocks contain a threshold minimum number of matched features; and
only utilizing the matched features inside the fixed size blocks that contain the threshold minimum number of matched features to perform the TRN.

18. The TRN system of claim 17, wherein the logic of the FPGA further:
for any feature in the second image, finds a best feature and a second best feature in the reference map;
counts a total count of best features and second best features in each fixed size block;
finds a peak fixed size block as the fixed size block with a highest total count;
finds all neighboring fixed size blocks that have a threshold minimum total count;
extracts all features from the peak fixed size block and the neighboring fixed size blocks; and
discards features from remaining fixed size blocks as outliers.

* * * * *